May 19, 1925.  
R. F. HALL  
AIRPLANE  
Filed May 12, 1922   12 Sheets-Sheet 2
1,538,800
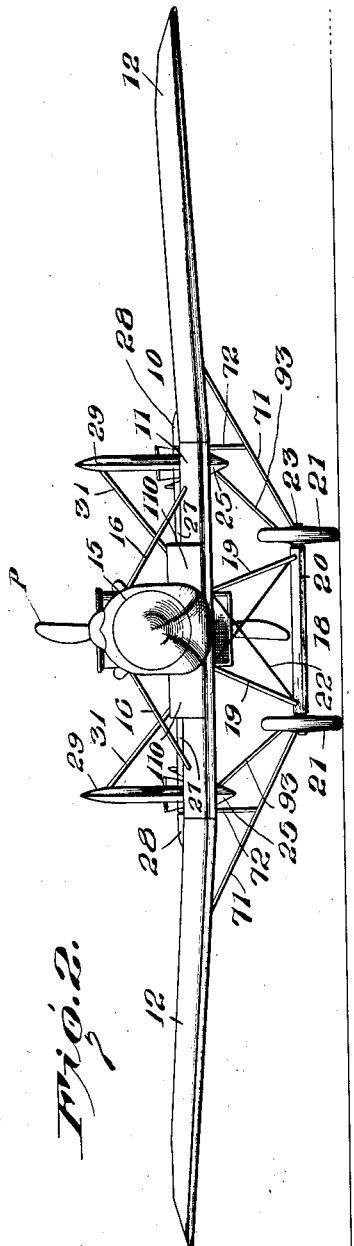
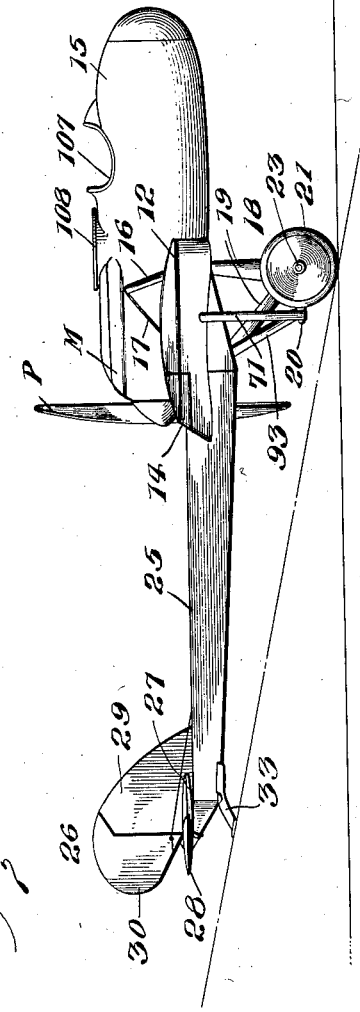
Inventor  
Randolph F. Hall,
Witness:  
Robert F. Beck
By Albert E. Jock.  
Attorney

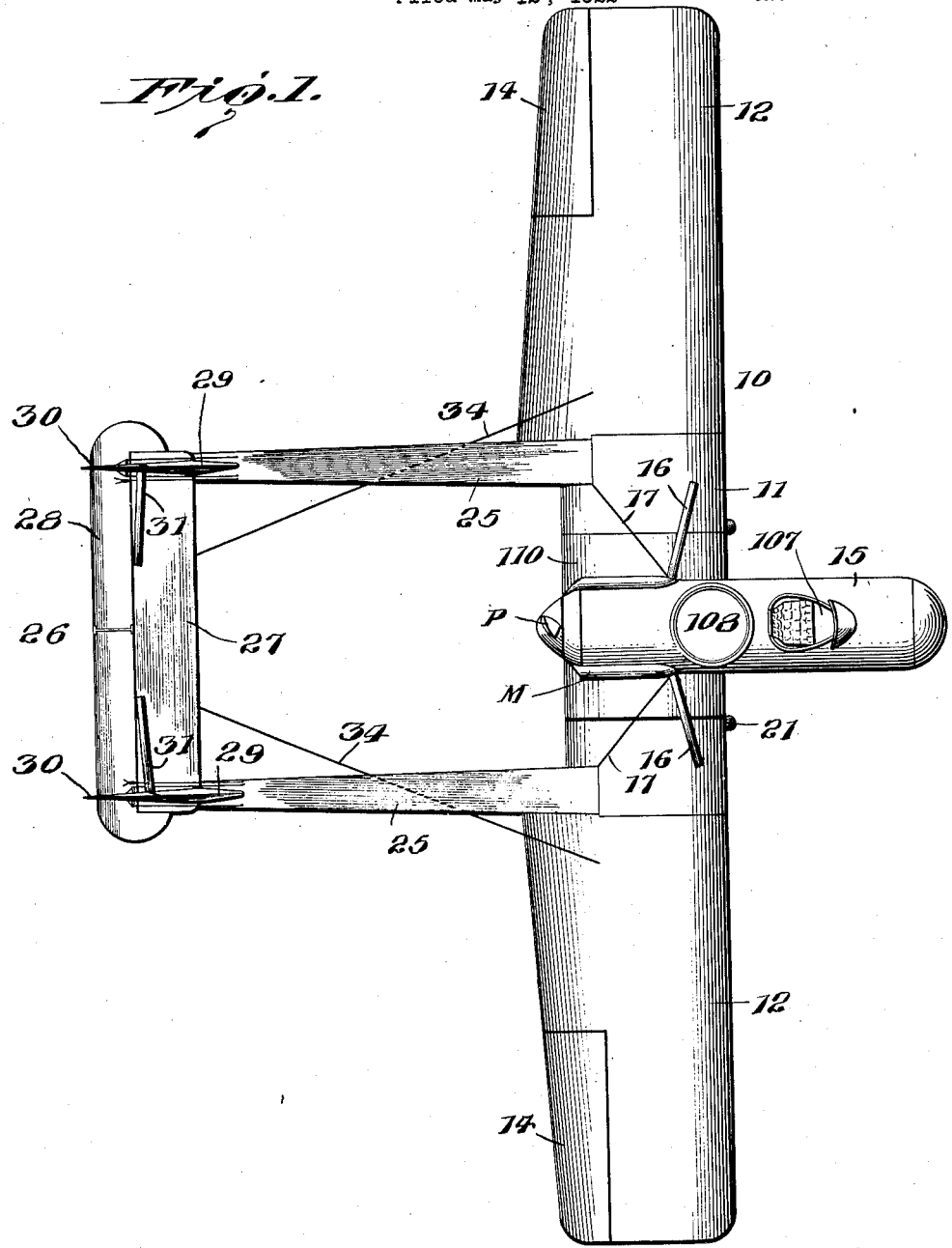

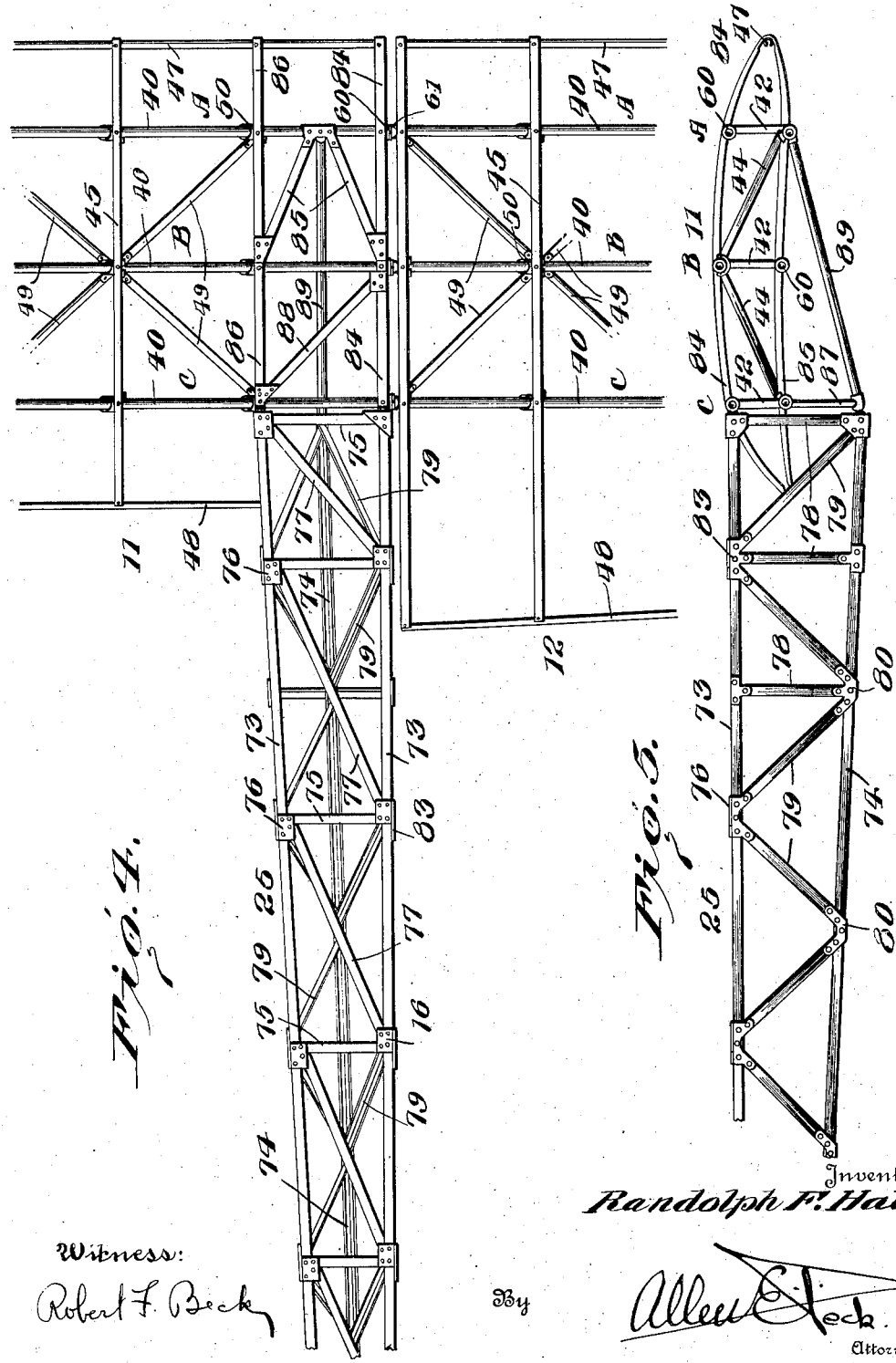

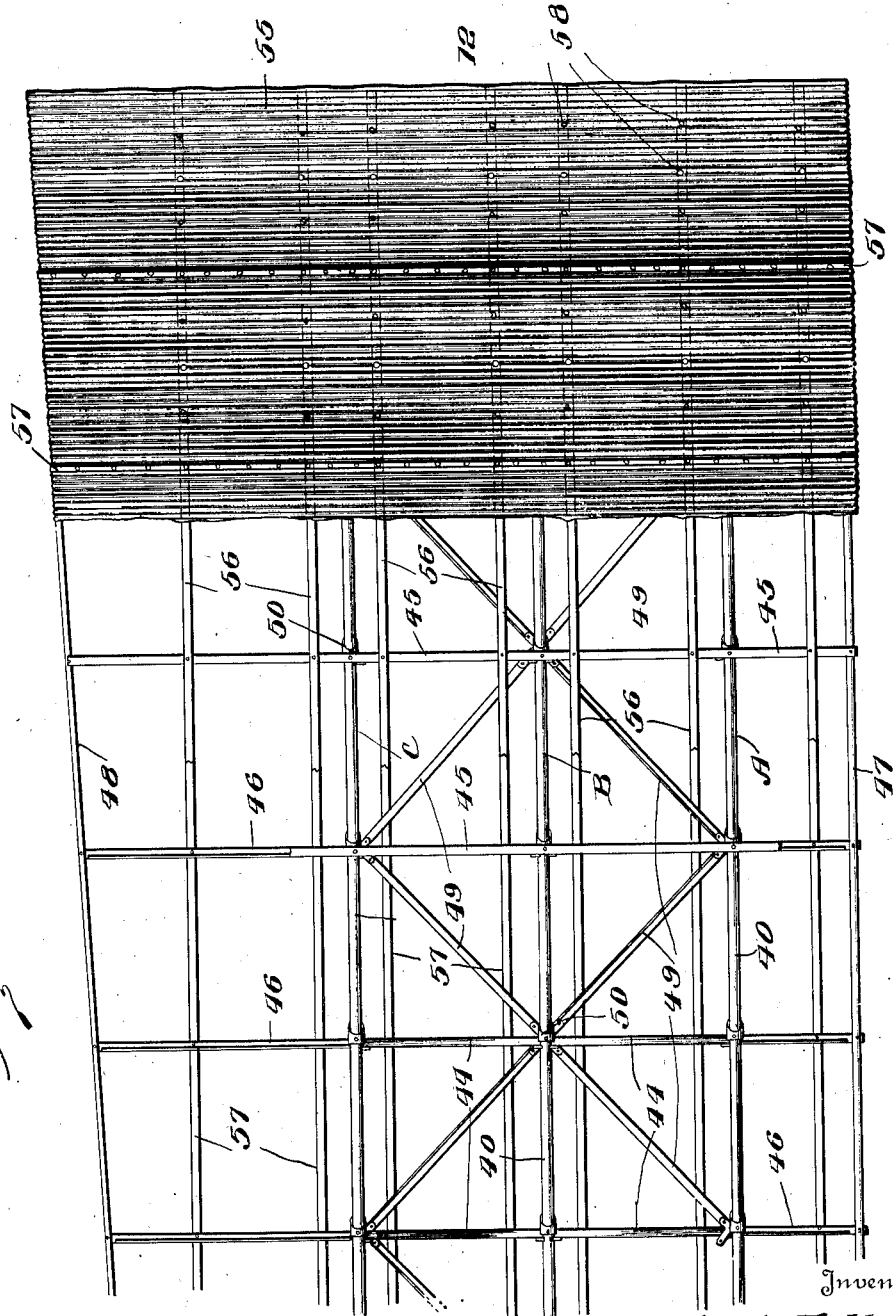

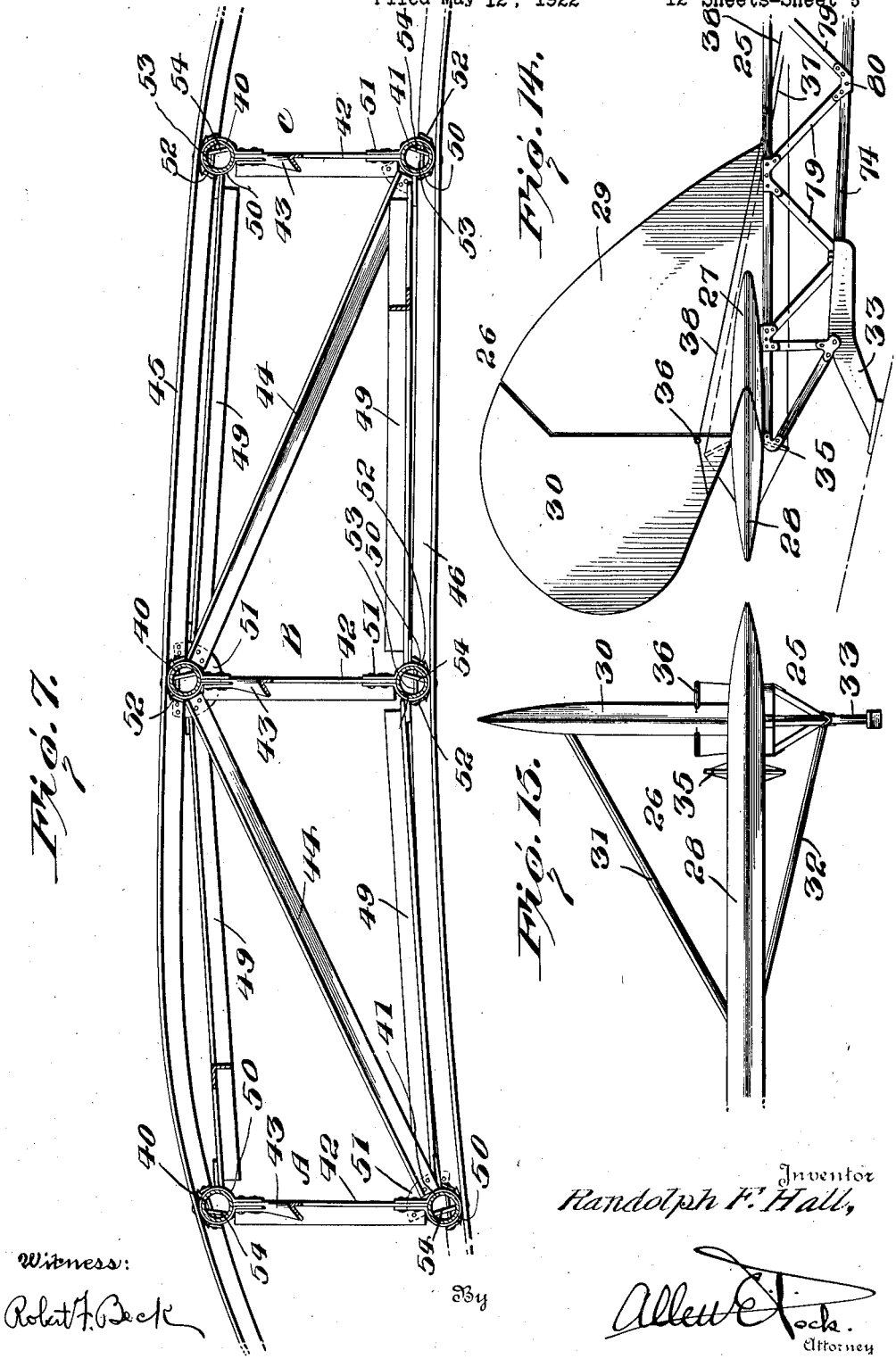

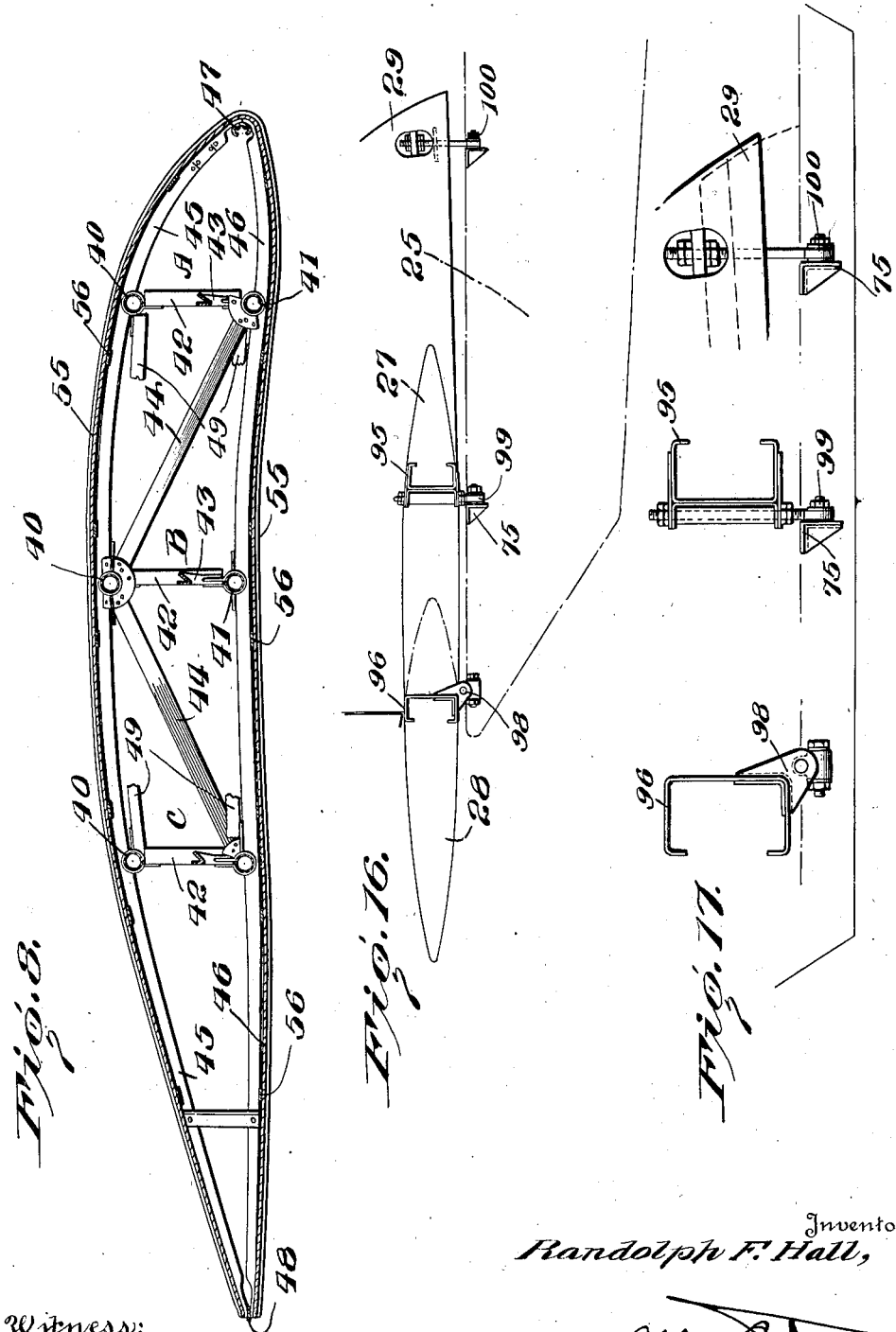

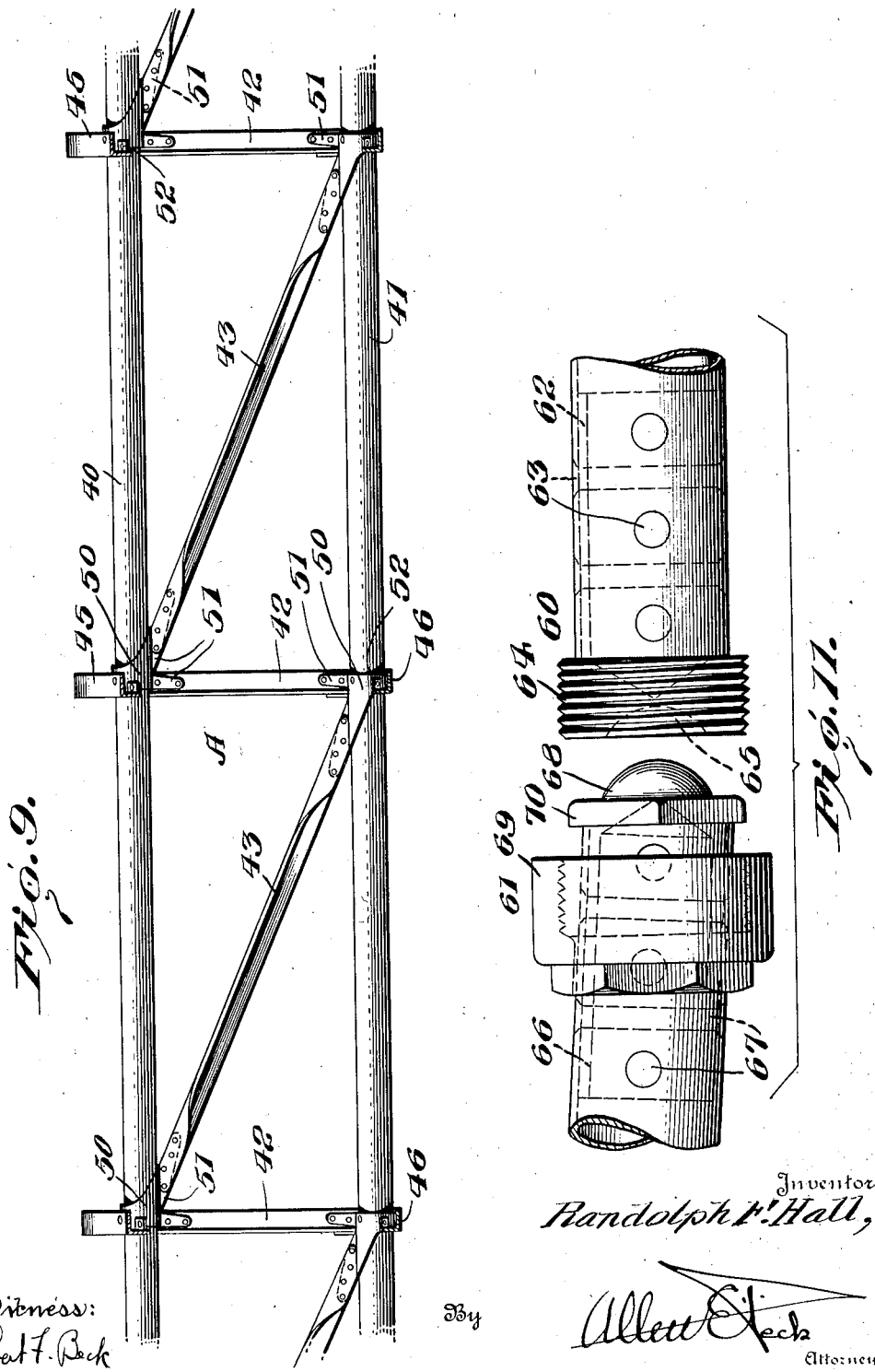

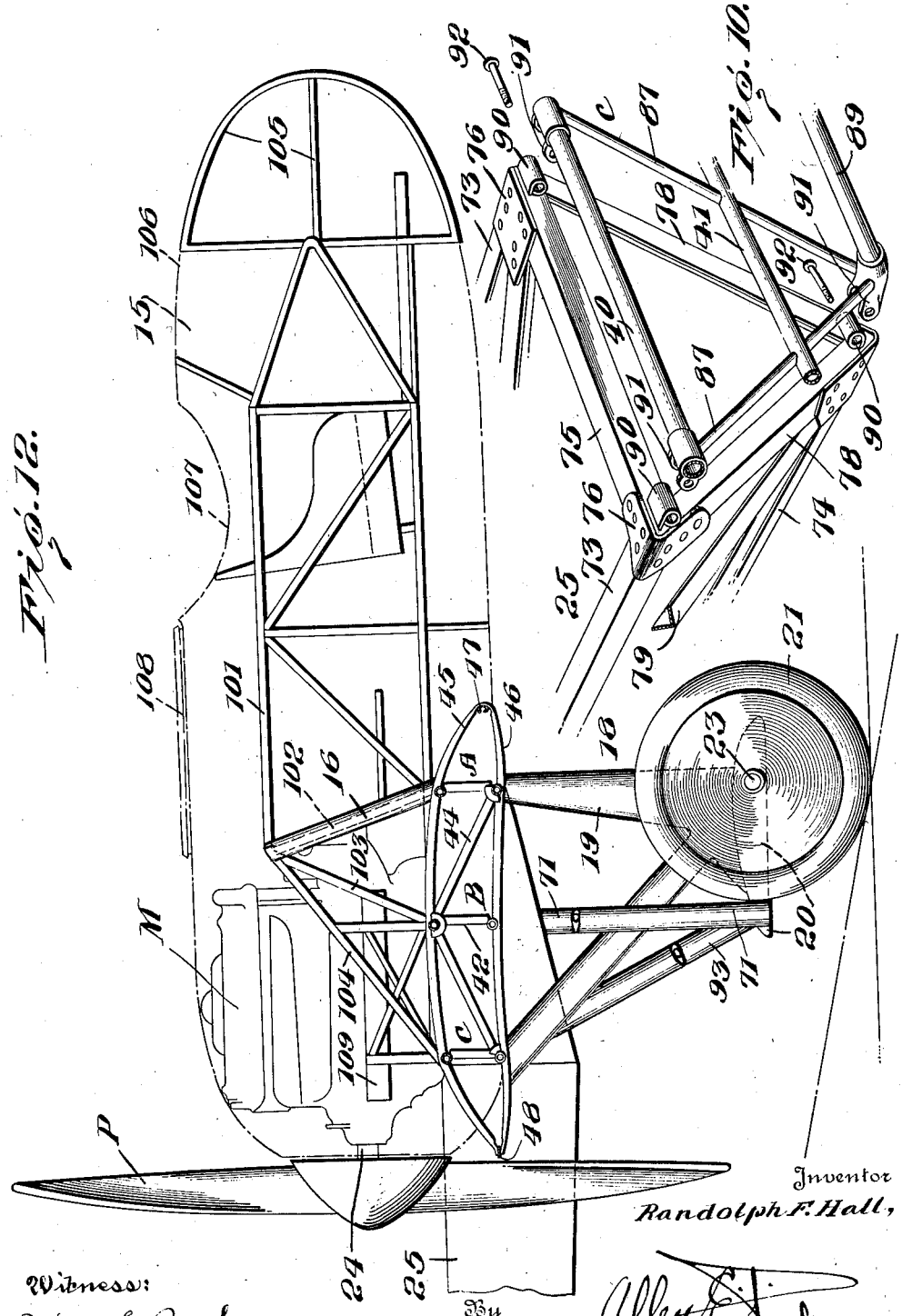

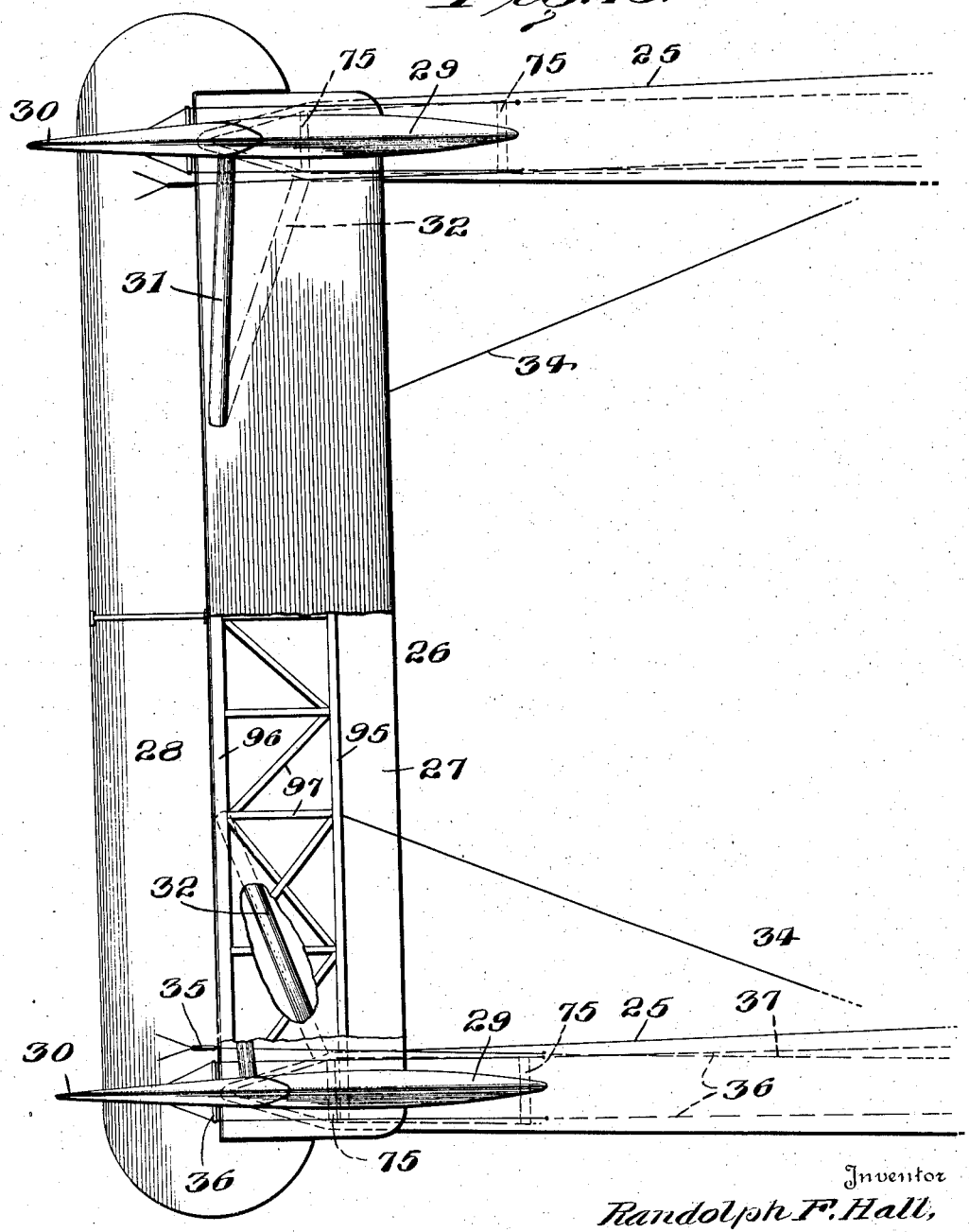

May 19, 1925. 1,538,800
R. F. HALL
AIRPLANE
Filed May 12, 1922  12 Sheets-Sheet 10
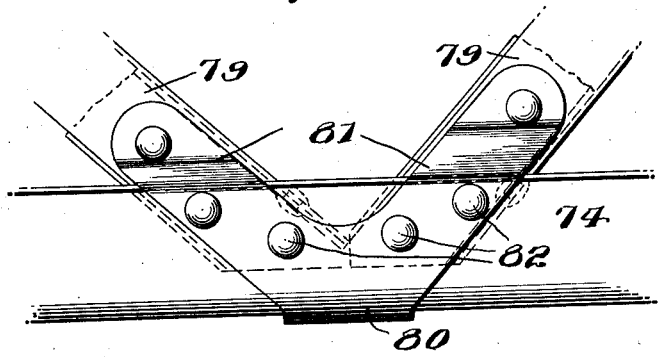
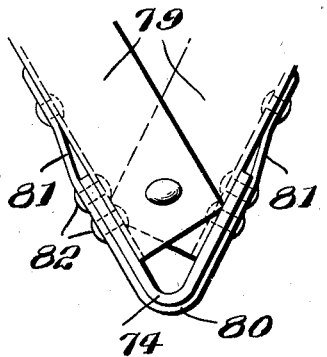
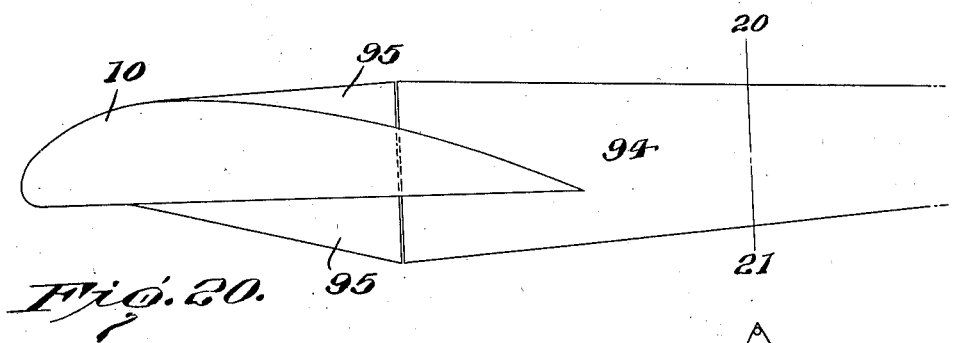
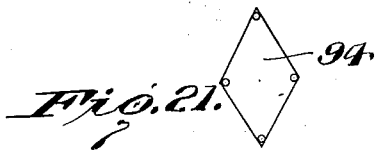
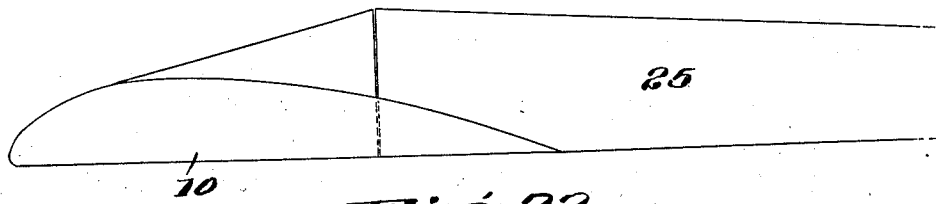
Inventor
Randolph F. Hall,
Witness: By
Robert F. Beck
Attorney

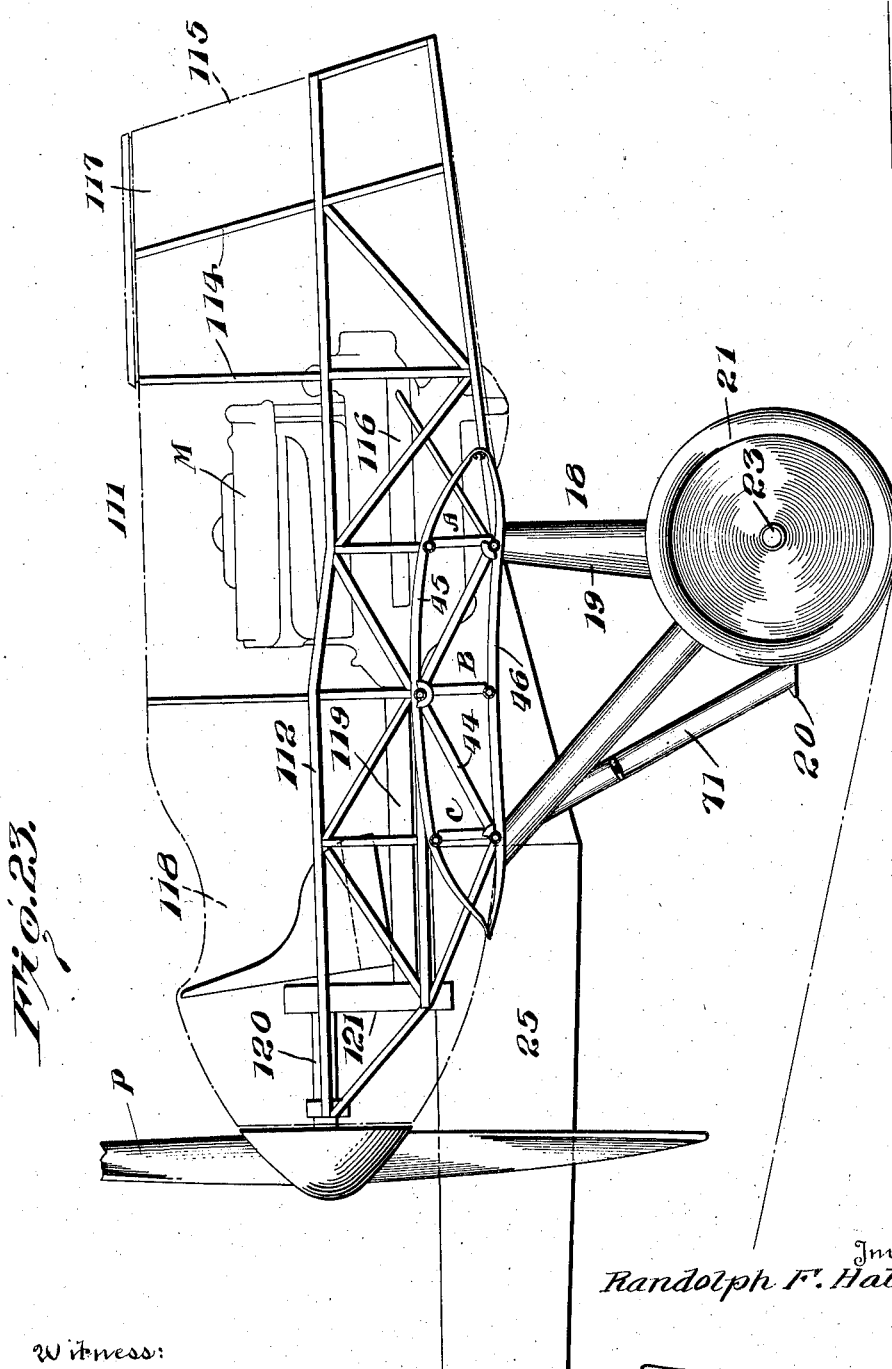

May 19, 1925. 1,538,800
R. F. HALL
AIRPLANE
Filed May 12, 1922 12 Sheets-Sheet 12
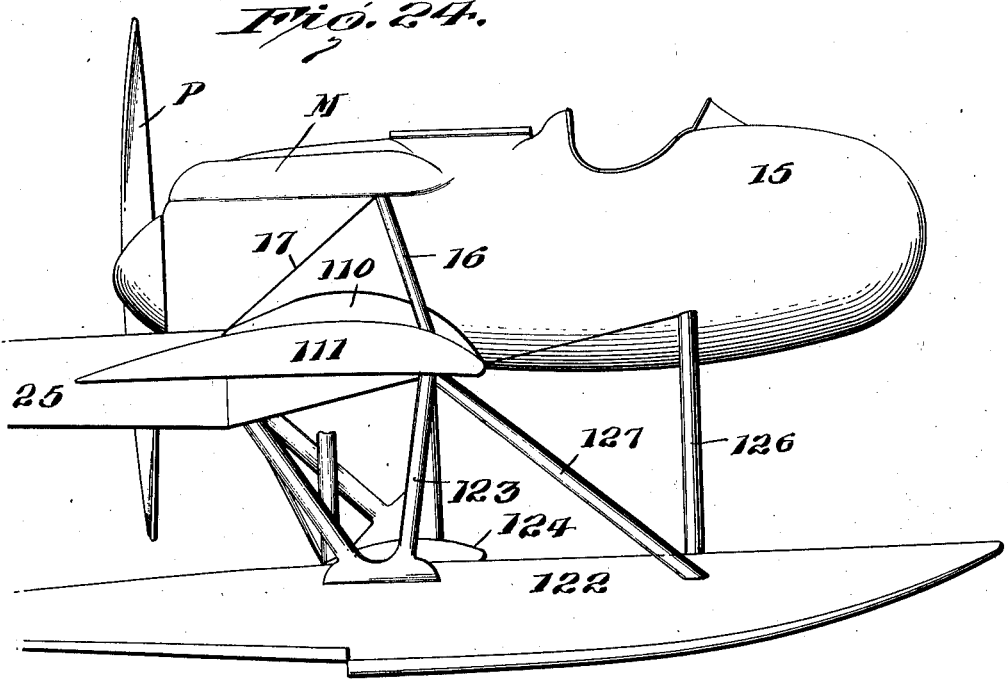
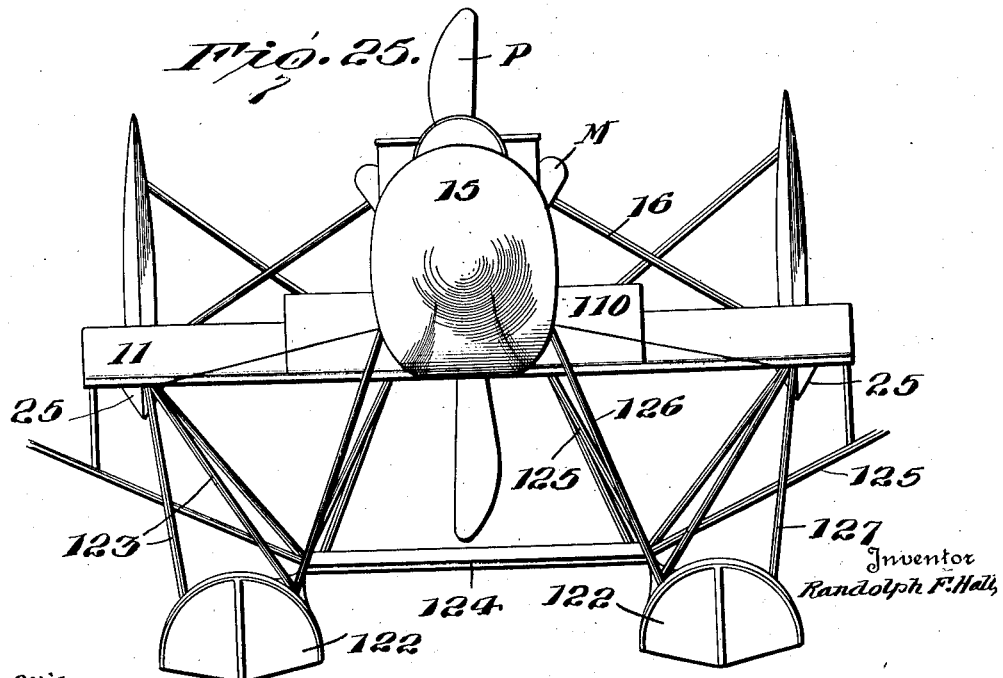

Patented May 19, 1925.

1,538,800

UNITED STATES PATENT OFFICE.

RANDOLPH F. HALL, OF ITHACA, NEW YORK, ASSIGNOR OF ONE-FOURTH TO THEODORE P. HALL, OF WALLINGFORD, CONNECTICUT, AND THREE-SIXTEENTHS TO PAUL WILSON, OF ITHACA, NEW YORK.

AIRPLANE.

Application filed May 12, 1922. Serial No. 560,384.

*To all whom it may concern:*

Be it known that I, RANDOLPH F. HALL, a citizen of the United States of America, and a resident of Ithaca, county of Tompkins, State of New York, have invented certain new and useful Improvements in Airplanes, of which the following is a specification.

This invention relates to certain improvements in airplanes; and the nature and objects of the invention will be readily understood and appreciated by those skilled in the arts involved in the light of the following explanation and description of the accompanying drawings illustrating what I at present consider to be the preferred embodiments or mechanical expressions of the invention from among various other forms, arrangements, combinations and constructions within the spirit and scope thereof.

The present invention has reference to those types and designs of airplanes provided with tail unit or empennage supporting outriggers, and is particularly directed to airplanes of the pusher types requiring the use of an outrigged tail unit or empennage. In the pusher types of airplanes, and particularly in those designs in which a pusher propeller is mounted along the longitudinal center of the airplane to the rear of the wings or supporting surface it is necessary to provide an outrigger structure for supporting the tail unit or empennage at the proper position with respect to, and the required distance from the rear of the main airplane structure (wings, body and undercarriage). At present, in accordance with the prevailing design practice, the known tail unit or empennage supporting outrigger structures in use are characterized generally by a structure formed of spaced spars or booms extending rearwardly a distance from the main airplane structure with the tail unit or empennage mounted and supported on the rear extended lengths of the spars or booms at the required distance from and in the proper position and alinement with respect to the main airplane structure. These spars or booms extending from the main airplane structure with the tail unit or empennage mounted on the rear lengths thereof are provided with suitable exterior bracing disposed in substantially vertical and horizontal planes, respectively, between and connecting the spars or booms with the main airplane structure, in order to care for and transmit the vertical and horizontal loads and stresses to which these outrigger spars or booms are subjected by the tail surfaces or empennage mounted and supported thereon. This outrigger bracing takes the form of exterior braces which are inclined forwardly from the outer rear lengths of the outrigger spars or booms and extend in vertically and horizontally disposed planes, respectively, to the main airplane structure where they are secured to the wings, body or undercarriage, at the required points to properly transmit and distribute the outrigger loads and stresses, and provide a strong, substantially rigid tail unit or empennage supporting outrigger structure.

In addition to the foregoing exterior bracing, suitable interspar bracing is provided between the main spaced spars or booms forming the outrigger structure.

The exterior bracing for the outrigger spars or booms, against vertically acting loads and stresses imposed by the tail unit or empennage mounted thereon, must extend in substantially vertically disposed planes from these spars or booms adjacent to the empennage mounted thereon, to points vertically distant therefrom. This is generally accomplished by providing braces inclined upwardly and forwardly from the rear or outer lengths of the outrigger spars to the wing structure of the airplane at points above the substantially harizontally disposed planes of the outrigger spars, and by providing similar braces inclined downwardly and forwardly from the spars to points on the wings or undercarriage below the outrigger spars or booms. Thus, the upwardly extending, vertically disposed braces are under tension and care for downwardly acting vertical loads and stresses imposed on the outrigger spars, while the downwardy extending vertically disposed braces are under tension and care for upwardly acting vertical loads and stresses, with the combined vertical bracing system transmitting and distributing the vertical empennage and outrigger loads to the main airplane structure. The outrigger spar bracing against horizontally acting loads imposed on the outrigger structure by the tail unit or empennage mounted thereon, are cared for by providing suitable horizontally disposed exterior braces between and extending from opposite sides of the outrigger structure to proper points on the airplane structure proper, usually to points on opposite wings. The foregoing general arrangement of outrigger bracing against the loads and stresses imposed by the tail unit or empennage mounted and supported thereon is varied and presented in different manners, but the fundamental and essential requirements and principles are present in the various arrangements of such bracing, to wit, the vertically disposed and forwardly extending exterior bracing from the outer, rear lengths of the spars or booms, and the exterior horizontally disposed bracing.

These tail unit or empennage supporting outriggers embodying the foregoing general characteristics, present structures which possess inherently high head or parasite resistance and low aerodynamic efficiency, due to the large extent of exterior exposed resistance creating surfaces formed by the outrigger spars or booms and the exterior bracing therefor. One of the fundamental, contributing causes to the relatively low aerodynamic efficiency of certain types of pusher airplanes, is due to the necessity of providing an outrigger structure for supporting the tail unit or empennage, with the resulting high parasite resistance and general lowering of the performance of such airplanes. Further, the necessity in such outrigger structures of vertically bracing the spars or booms thereof against vertically acting loads and stresses imposed thereon by the tail unit or empennage, has limited these outrigger structures to use and mounting on and in connection with the multiplane types of airplanes, in order to secure the necessary extent of structure in the airplane proper, above and below the horizontally disposed planes of the outrigger spars or booms to which the vertically and forwardly extending outrigger bracing can be secured to properly care for the vertically acting loads and stresses to which the outrigger structure is subjected. For the above and certain other reasons, the use of the monoplane type with its relatively high aerodynamic efficiency over multiplane types, has been difficult in those types of pusher airplanes, as well as other types of airplanes, in which the outrigged tail unit or empennage is required.

Therefore, one of the fundamental objects of the present invention is to provide a design, construction and mounting of tail unit or empennage supporting outrigger structure in which the high parasite or head resistance inherent in the prevailing types of outrigger structures at present in use, is materially and effectively reduced to the minimum possible by the elimination of the exterior exposed outrigger bracing and by the provision of an outrigger structure of exceedingly clean design with minimum weight, but relatively high factor of safety; and further to provide such an outrigger structure which, while equally adapted to multiplane types, is also applicable to and particularly efficient with airplanes of the monoplane types, thus permitting the use of the monoplane in pusher or other types requiring an outrigged tail unit or empennage, with the resulting aerodynamical advantages from the use of the monoplane type.

A further object of the invention is to provide an empennage supporting outrigger structure composed of spaced internally braced girders secured and attached at the forward ends thereof to the main wing truss of an internally trussed wing and extending rearwardly therefrom with a tail unit or empennage mounted on the outer lengths thereof, the arrangement and construction of the girders being such that the vertical and horizontal loads imposed thereon are transmitted to and distributed along the main wing truss to which they are secured without the necessity of providing exterior bracing between the girders and the main airplane structure of which the wing forms an element.

A further object of the invention is to provide an improved design and construction of pusher airplane of the monoplane type embodying the principles of the tail unit or empennage supporting outrigger features of the invention; the main characteristics of which design of pusher monoplane are; the mounting and construction of the wing with detachable outer panels secured to a center section or panel; the detachable mounting of the outrigger structure to the center panel without the use of exposed exterior bracing; the mounting of the tail unit or empennage on the outrigger structure in such a manner that the alinement of the empennage surfaces will not be materially affected by bending or deflection in the outrigger structure; the construction and mounting of the nacelle on and detachably secured to the center panel of the wing and the attaining of maximum vision, and of range of armament fire when used for military purposes, from the nacelle; the mounting and arrangement of the power plant within the nacelle and driving a pusher propeller; and the general design and arrangement of major elements to secure inherent stability, minimum head or parasite resistance and slipstream interference from exposed parts, and a relatively high general performance and manœuverability in an airplane of the pusher type, or other type requiring the use of an outrigged empennage.

A still further aim and object of the invention is to provide an embodiment thereof of all metal construction in which the main features and characteristics of the invention are incorporated and presented; and further to provide certain novel improvements in the metal construction which are applicable generally to all metal airplane construction, particularly with respect to the wing construction, the empennage supporting outrigger and empennage mounting thereon, and to the manner of applying and securing the metal skin covering and enclosing the wings and empennage supporting outrigger elements, as well as certain further details of construction and arrangements in all metal airplane construction.

With the foregoing and various other objects in view relating to features of design, construction and arrangements of elements, which other objects and their resulting advantages will be readily recognized and appreciated by those familiar with and skilled in the aeronautical art, the invention consists in certain novel features in airplane design and in constructions and arrangements of parts, as will be more fully and specifically referred to and pointed out hereinafter.

Referring to the accompanying drawings:

Fig. 1 is a view in top plan of an all metal monoplane design of the pusher type embodying the features of the present invention.

Fig. 2 is a view in front elevation.

Fig. 3 is a view in side elevation.

Fig. 4 is a top plan view of an outer end portion of the center panel of the wing, and of one of the outrigger girders mounted thereon and attached thereto, the skin being removed from the center panel and the girder to show the construction and arrangement thereof, particularly the construction and arrangement of the built-in truss of the center panel to which the outrigger girder is attached; a portion of an outer wing panel being also shown detachably mounted in position on the center panel.

Fig. 5 is a view in side elevation of an outer end of the center panel of the wing and the built-in girder attaching truss forming a part thereof, and of an outrigger girder mounted on the center panel and attached to the built-in truss thereof, the skin being removed to show the construction and arrangement of the outrigger girder.

Fig. 6 is a top plan view of a portion of one of the outer detachable wing panels, a part of the skin being removed to show the construction and arrangement of wing frame and internal bracing therefor; and a part of the metal skin therefor being shown applied thereon and secured thereto.

Fig. 7 is a transverse vertical section through the main longitudinal truss of one of the outer wing panels, showing the construction of truss beams with the interbracing therefor, and also showing upper and lower contour formers and the manner of mounting and securing the same over and to the main wing truss beams, the leading and trailing edge portions of the contour formers not being shown.

Fig. 8 is a transverse vertical section through one of the outer wing panels.

Fig. 9 is a detail vertical, longitudinal section through a portion of one of the outer wing panels with the skin removed and taken forwardly of the front wing truss beam; the contour formers being shown partly in section and a portion of the front wing truss beam and interbracing thereof being shown in elevation.

Fig. 10 is a detail perspective view of the inner end of an outrigger girder and of a portion of the rear end of one of the built-in trusses of the center wing panel to which the outrigger girder is mounted and attached; showing the girder and built-in wing panel truss detached in relative position for mounting, and showing one construction and arrangement for detachably connecting and mounting the outrigger girders to the center panel.

Fig. 11 is a detail view in side elevation of the construction and arrangement of the fittings for detachably mounting the outer wing panels to the center wing panel, portions of the upper longitudinals of a main truss beam of the center panel and of an outer wing panel being shown.

Fig. 12 is a detail view in side elevation of the undercarriage, center wing panel and nacelle mounted thereon, with the outer wing panel detached, and particularly showing the nacelle construction and manner of mounting and securing the same on and to the center panel, together with the cockpit arrangement and motor mounting within the nacelle; the nacelle skin and the mounted position of an outrigger girder being indicated in dotted outline.

Fig. 13 is a top plan view of the tail unit or empennage in mounted position on the outer rear end of the outrigger; portions of the outrigger girders being shown, and a part of the upper horizontal stabilizer skin being broken away to show the construction of the stabilizer frame and the bracing between the stabilizer and the outrigger girders.

Fig. 14 is a detail view, in side elevation of the rear end portion of an outrigger girder with the skin removed and the tail unit mounted thereon, showing the relative position of the tail unit with respect to the girder, and further showing the position and mounting of the tail skids on the outrigger girders.

Fig. 15 is a detail, fragmentary view, in rear elevation of one of the outrigger girders and a portion of the tail unit in mounted position thereon.

Fig. 16 is a view in side elevation, and more or less diagrammatical, showing the manner of mounting the horizontal and vertical stabilizers, which are shown in dotted outline, of the tail unit or empennage on and to the outrigger girders, one of the outrigger girders being partially shown in dotted outline.

Fig. 17 is a detail view more or less diagrammatical, and in side elevation, of the fittings for mounting and attaching the horizontal and vertical stabilizers of the tail unit to the outrigger girders; the fittings being shown in relative mounted position.

Fig. 18 is a detail fragmentary view in side elevation of a portion of the lower girder longitudinal and the manner of attaching the girder longitudinal interbracing thereto.

Fig. 19 is a detail vertical transverse section through the lower girder longitudinal and showing portions of the girder interbracing and the manner of attaching the same.

Fig. 20 is a more or less diagrammatical view in side elevation of a modified form of outrigger girder in mounted position on a wing.

Fig. 21 is a vertical section more or less diagrammatically taken on the line 21—21, Fig. 20.

Fig. 22 is a view, more or less diagrammatical, of another manner of mounting the preferred form of outrigger girder to a wing.

Fig. 23 is a detail view in side elevation of a modified form of nacelle, showing particularly the cockpit arrangement and motor disposition and mounting, together with a propeller transmission driven thereby.

Fig. 24 is a side elevation of the design of airplane of the invention equipped with twin pontoons in place of the undercarriage of the preferred form, and showing the mounting and general arrangement of the trussing therefor.

Fig. 25 is a front elevation of the twin pontoon mounting and arrangement shown in Fig. 24.

The various features of the invention are presented and described herewith, purely by way of example, as embodied in a monoplane design of the pusher type constructed of metal throughout, but it is to be understood, as will be readily apparent to those familiar with this art, that certain of the main features of the invention are not limited to use in all-metal constructions, as such features of the invention are equally applicable and adapted to use with and embodiment in airplanes constructed of any materials, or of any desired combinations of materials. Further, in the preferred form and embodiments of the invention shown and described the various features thereof are applied to a pusher type airplane of monoplane design, but the various features of the invention, and particularly the tail unit or empennage supporting outrigger design, construction and mounting features thereof, are applicable and adapted generally to use with and embodiment in airplanes of the multiplane types in which an outrigged tail unit or empennage is required, or is desired.

In the preferred form and example illustrated in the accompanying drawings, the invention is presented as embodied in a monoplane of the pusher type provided with a single pusher propeller mounted on an axis along the longitudinal center of the airplane. This preferred form of the invention is illustrated generally in Figs. 1 to 3 of the accompanying drawings, and includes a monoplane wing or main supporting surface 10, consisting of the center section or panel 11, and detachable outer panels 12, secured to and extending from opposite sides and in lateral continuation of the center panel 11. The detachable outer panels 12 of the wing 10 are provided with the usual ailerons 14, and these outer panels 12 are preferably mounted on and attached to the center panel 11, to form a dihedral angle in the wing 10, with the resulting advantages in inherent lateral stability. This dihedral angle in the wing 10 is clearly indicated in the preferred embodiment of the invention as illustrated in Figs. 2 and 3. A suitable nacelle 15 is detachably mounted on and secured to the center panel 11, along the longitudinal center of the airplane, and this nacelle 15 extends forwardly from the center panel 11 a distance beyond the leading edge thereof. The nacelle 15 is exteriorly braced and trussed from the center panel 11 by rigid opposite side struts 16 extending downwardly and outwardly and inclined forwardly from the nacelle 15 to the forward portion of the center section or panel; and by opposite side brace wires or tie rods 17 extending from the same points on opposite sides of the nacelle as the struts 16, outwardly, downwardly and rearwardly to the rear or trailing portion of the center panel 11 (see particularly Fig. 1).

An undercarriage 18 of the usual or any other suitable or desired type, is mounted below and attached to the center panel 11 beneath the nacelle 15 and depends downwardly from the center panel. In the present instance, the undercarriage 18 comprises a pair of V-trusses 19 spaced apart and each secured at the diverged ends of the struts forming the same, respectively, to the center panel 11. These V-trusses 19 depend downwardly from the center panel 11 and are inclined outwardly to and terminating a distance below the center panel in the converged ends of the struts forming the same, respectively. The lower spaced ends of the V-trusses 19 are attached to and connected by suitable horizontally disposed fairing 20 forming a lifting surface which encloses and houses an axle 23 extending between and outwardly beyond the opposite V-trusses 19, the opposite outer ends of which axle are provided with the landing wheels 21.

Any suitable shock absorbing means (not shown) is provided and enclosed in the lifting surface formed by the fairing 20 for absorbing the landing shocks and strains to which the landing carriage is subjected as is well known and understood by those skilled in this art. Vertically disposed diagonal drift bracing 22 is provided between the opposite spaced V-trusses 19 to strengthen the landing carriage in the usual manner.

A motor M is mounted in and enclosed by the nacelle 15 and drives a propeller shaft 24 (see Fig. 12), in this instance the motor crank shaft, which is disposed along the longitudinal center of the nacelle 15 (longitudinal or fore and aft axis of the airplane) and extends rearwardly and outwardly beyond the rear end of the nacelle 15. A pusher propeller P is mounted on the outer end length of the shaft 24 to the rear of the trailing edge of the center panel 11, of the monoplane wing 10. Due to the position and mounting of the pusher propeller P along the longitudinal axis of the airplane and to the rear of the wing 10, in order to properly position and mount the tail unit or empennage at the required distance to the rear of the supporting surface or wing 10, and in the proper position along and with respect to the longitudinal center of the airplane to the rear of and in line with the slipstream of the propeller P, it is necessary to provide an outrigger structure extending rearwardly from the wing 10 and affording the necessary clearance to the propeller P and the minimum slipstream interference from structural elements.

According to the present invention, the tail unit or empennage supporting outrigger structure is formed by spaced substantially horizontally disposed outrigger girders 25 extending rearwardly from opposite points in the rear or trailing portion of the center panel 11, adjacent the outer ends thereof, respectively, with the pusher propeller P mounted to the rear of the center panel, located and extending between the forward, center panel attached end portions of the said spaced outrigger girders. A tail unit or empennage 26 is mounted on and across the spaced rear ends of the outrigger girders 25 at the required distance rearwardly from the main supporting surface 10 and back of and in line with the pusher propeller P and the slipstream therefrom. The tail unit or empennage 26 is mounted at a distance rearwardly from and in such a position with respect to the wing 10 and propeller P, as to secure the required balance and the necessary effect from the empennage surfaces in the flight and control of the airplane. In the illustrated embodiment, the tail unit or empennage 26 consists of the horizontal stabilizer 27 extending transversely across and between the spaced rear ends of the outrigger girders 25 and adjustably mounted and attached thereto. A balanced elevator 28 is suitably horizontally pivoted on and along the trailing edge of the horizontal stabilizer 26 and forms a rearward continuation thereof, in the usual manner. The vertical empennage surfaces are double and comprise twin vertical stabilizers 29 attached to the rear ends of the girders 25 along the longitudinal centers thereof, respectively, and extending vertically upward therefrom above the stabilizer 27. A balanced rudder 30 is vertically pivoted on and along the rear trailing edge of each vertical stabilizer, respectively, for lateral horizontal swinging movement thereon, thus providing twin balanced rudders for lateral directional control of the airplane.

The horizontal and vertical stabilizers are integral and are rigidly braced. The vertical stabilizers 29 are laterally braced by the struts 31 extending from the upper inner sides thereof, respectively, downwardly and inwardly to spaced points on the fixed horizontal stabilizer 27. The horizontal stabilizer 27 is braced by opposite under struts 32 extending downwardly, outwardly and forwardly from points at the under side thereof a distance inwardly from the outrigger girders 25, respectively, to points on the lower rear ends of the outrigger girders. These understruts 32 are shown in Fig. 13 of the drawings particularly, and are provided with and include any suitable spring or other tension connection (not shown) to reduce the possibility of inducing bending in the stabilizer from unequal deflection of the outrigger girders 25. A tail skid 33 is pivotally mounted on the under lower side of the rear end of each outrigger girder 25, and the horizontal stabilizer under struts 32 are preferably mounted on and attached to the outrigger girders at or adjacent the tail skid pivots, respectively. Stream line tie rods 34 are provided from the horizontal stabilizer 27, and extend forwardly and outwardly across the outrigger girders 25, respectively, to the opposite outer panels 12 of the wing 10. However, these rods 34 are not essential to the required strength and factor of safety of the outrigger structure and empennage supported thereon, and may be omitted without any material lowering of the factor of safety.

The spaced rearwardly extending empennage supporting outrigger girders 25 are internally trussed and supported solely from the center panel structure to which they are detachably secured at their forward ends. These girders 25 are built up hollow structures covered with a suitable skin and are so constructed and mounted that, through the medium of the internal bracing thereof, all exterior bracing from the outrigger structure to the wing is eliminated, and the vertical and horizontal loads and stresses imposed at the outer rear ends thereof by the tail unit or empennage mounted thereon are transmitted therethrough by the girder structure and distributed to the center panel structure. The design construction and mounting of these outrigger girders 25 is referred to and described in detail hereinafter.

The control system for the empennage surfaces includes the usual control cables from the nacelle and in the present invention, due to the design and construction of the outrigger girders, these control cables are practically entirely enclosed, with the resulting decrease in parasite resistance over exposed cables, as well as the elimination of possible breakage or damage from exterior forces. The elevator 28 is provided with the control horns or cranks 35 mounted thereon adjacent the outrigger girders 25, and the rudders 30 are provided with the cranks or control horns 36, respectively, extending laterally from the opposite sides thereof. The elevator control cranks 35 are connected to the control cables 37 which extend forwardly into and through the interior of the outrigger girders 25; and each rudder control crank 36 is connected at the opposite ends with a pair of control cables 38 which extend forwardly into and through the respective girder 25 above which the rudder is mounted. These various empennage control cables extend forwardly through and are enclosed within the outrigger girders, to and through the center panel 11 by means of suitable connections leading to the control levers mounted in the nacelle 15. Thus, the empennage control cables are protected and the parasite resistance offered thereby is eliminated, while by the provision of suitable inspection doors in the outrigger girders 25, the control cables are readily accessible for inspection and repair.

The wing 10 is of the semi-cantilever, internally braced type in which exterior bracing is reduced to the minimum, and consists of the center panel 11 and the opposite outer detachable panels 12. In the embodiment illustrated, the monoplane wing 10 includes a main longitudinal truss extending from tip to tip thereof through the center panel 11 and the outer detachable panels 12, the portion of the main truss in the center panel being detachably connected and alined with the portions thereof in the outer panels. This main longitudinal wing truss is formed of front middle and rear built up truss beams each consisting of upper and lower longitudinals and interbracing connecting and spacing the same. The truss beams so formed are assembled and connected in proper spaced relation by a series of transverse contour formers extending across and secured to the upper and lower truss beam longitudinals, and interbracing is provided between the vertically alined upper and lower contour formers, respectively. The pairs of upper and lower contour formers extend and converge forwardly and rearwardly from the main wing truss to define the leading and trailing edges, respectively, of the wing. A suitable covering or skin, in the present example corrugated sheet metal, is secured and attached over and to the frame formed by the main longitudinal truss and the series of transverse contour formers, the upper and lower camber of the wing being determined by the longitudinal curve and shape given the contour formers.

The wing construction of the present preferred embodiment of the invention, as generally outlined above, is particularly disclosed and illustrated in Figs. 4 to 9, of the accompanying drawings. The main longitudinal wing truss comprises the built-up front, middle and rear truss beams A, B, and C, respectively, each consisting of the spaced upper and lower tube longitudinals 40 and 41, respectively. The upper and lower longitudinals of each truss beam are interconnected and braced by a series of vertically disposed angle members 42 extending therebetween at spaced intervals therealong; and by a series of diagonally disposed angle members 43 extending from the upper ends of the braces 42 downwardly and inwardly to the lower ends of the braces 42, respectively, adjacent thereto (see Fig. 9). Thus, each wing truss beam A, B, and C is built up of the upper and lower longitudinals 40 and 41, interconnected and rigidly braced by the angle member braces 42 and 43. The wing truss beams A, B, and C so constructed are spaced apart transversely of the wing and extend in substantially parallel relation longitudinally thereof. The spaced truss beams A, B and C are interconnected and braced by a series of transversely disposed angle members forming the braces 44 extending downwardly from the upper longitudinal 40 of the middle truss beam B at the upper ends of the spaced vertical braces 42, forwardly and rearwardly to the lower longitudinals 41 of the front and rear truss beams A and B, respectively, at the lower ends of the braces 42 thereof, opposite and in line with the diagonally disposed braces 44, respectively (see particularly Figs. 6, 7 and 8).

A series of upper and lower contour formers 45 and 46 are secured transversely across and attached to the upper and lower longitudinals, respectively, of the truss beams A, B and C forming the main longitudinal wing truss. The series of upper contour formers 45 are spaced apart and attached to the upper longitudinals 40 of the truss beams, above and in the same transverse vertical planes with the spaced series of diagonal braces 44, respectively, extending transversely between and connecting the truss beams A, B and C. The series of lower contour formers 46 are spaced apart and attached transversely across the lower longitudinals 41 of the truss beams A, B and C, directly below, in line with and in the same transverse vertical planes as the series of spaced upper contour formers 45 and 46, respectively. The series of spaced upper and lower contour formers are extended forwardly and rearwardly beyond the main wing truss and are curved downwardly and upwardly, respectively, to converge in a series of spaced points along and forwardly of the wing truss, and in a series of spaced points rearwardly of the wing truss. The forward converged ends of the upper and lower contour formers define the line of the leading edge of the wing and are connected by a longitudinally extending leading edge bar 47, while the series of rear converged ends of the upper and lower contour formers define the line of the trailing edge of the wing and are connected by a longitudinally extending edge bar 48 (see Figs. 6 and 8). Thus it will be apparent from the foregoing that the spaced series of pairs of upper and lower contour formers 45 and 46, with the diagonal inter-truss beam bracing 44 and the vertical interbracing between the upper and lower longitudinals of each truss beam, provides, in effect, a series of transverse ribs extending in and through the wing. Any suitable or desired drift bracing 49 extending diagonally across the cells of the wing defined by the spaced contour formers, is provided between the truss beams of the main wing truss in the horizontal planes of the upper and lower beam longitudinals, respectively, (see Fig. 6).

In the all-metal wing construction of the invention, the longitudinals 40 and 41 of the wing truss beams A, B and C, respectively, are formed of suitable metal tubes. Metal fittings 50 are attached around and secured to the wing beam longitudinals 40 and 41 at the proper points to receive the ends of the interbracing 42 and 43 between the truss beam longitudinals, and the interbracing 44 between the truss beams. These fittings 50 are provided with various lugs and plates 51 to which the ends of the interbracing is attached, as by riveting, welding or any other desired manner. The various interbracing 42, 43 and 44, are preferably formed of metal angle bars of L-shape in cross section as indicated in the drawings. The transverse upper and lower contour formers 45 and 46, are formed of angle bars L-shaped in cross section and are secured across and attached to the wing beam longitudinals by cutting the vertically disposed flange thereof and bending opposite portions thereof outwardly to form openings in the vertical flange to receive the tube longitudinals, with the bent out portions of the vertical flange forming ears 52 on opposite sides of the longitudinals through which the attaching rivets 53 are extended and secured. With this manner of mounting the contour formers, the horizontally disposed flange thereof rests upon and across the beam longitudinals and the attaching rivets 54 are extended downwardly through the contour formers and the tube longitudinals at the points they rest thereagainst, thus the contour formers are rigidly secured and attached to the truss beam longitudinals by the horizontally disposed rivets 53 and the vertically disposed rivets 54 passing therethrough and binding the contour formers to the beam longitudinals. In this connection see particularly Figs. 7 and 9.

The wing frame so formed and constructed, is covered with and enclosed by any suitable or desired skin, preferably corrugated sheet 55 as illustrated in Figs. 6 and 8, of the accompanying drawings. A series of spaced upper and lower longitudinal stringers 56 and 57, respectively, are extended across the upper and lower contour formers 45 and 46, longitudinally of the wing, and are suitably riveted, welded or otherwise attached thereto (see particularly Fig. 6). The corrugated metal sheets 55 are placed transversely across, that is, with the corrugations thereof disposed transversely of the wing in the direction of flight thereof, and riveted or otherwise secured on and to the longitudinal stringers 56, as clearly shown and indicated in Fig. 6. Transverse binding strips 57 are then placed at spaced intervals transversely across and on the corrugated skin, preferably over the transverse contour formers 45, and rivets 58 or other suitable fastening means, are secured through the binding strips, skin 55 and stringers therebelow, to securely bind and attach the metal skin between the binding strips and the stringers which are attached to the transverse contour formers. The metal skin 55 is secured by rivets 58 along the longitudinal stringers between the binding strips 57 and formers 45 therebeneath, in order to firmly attach and stiffen the skin between contour formers. The skin is further attached by rivets 58 along the line of the contour formers 45 and binding strips 57, transversely of the wing. The corrugated sheets may be bent over and around the leading edge bar 47, as indicated in Fig. 8, and extend rearwardly across and secured to the upper and lower sides of the wing frame, with the rear edges thereof suitably attached to the wing frame along the trailing edge thereof. However, other arrangements of the metal sheet 55 may be utilized, the feature of particular note being the employment of the longitudinal stringers 56 and the riveting or other means of attaching the metal sheets thereto through the medium of the binding strips 57. By the construction and arrangement of the metallic wing frame covered with and enclosed by the corrugated metal skin, a wing of minimum weight and skin friction, with maximum strength is secured in which the corrugated metal sheet 55 forming the skin thereof adds to the strength in absorbing and caring for certain of the strains and stresses to which the wing is subjected, as will be apparent to those skilled in this art from the foregoing description of the wing construction in the light of the accompanying drawings.

The outer wing panels 12 are detachably mounted on and attached to the opposite ends of the center panel 11. As described hereinbefore, the main longitudinal wing truss composed of the interconnected and interbraced front, middle and rear truss beams A, B and C, extends longitudinally of the wing span from tip to tip, the truss beams being suitably tapered toward the outer ends to give the desired taper to the wing. In the present embodiment of the invention the main wing truss comprises three sections or units, the portion extending through the center panel 11 and the two outer portions extending through the opposite outer panels 12, respectively. In assembled mounted position of the wing 10 these three sections or units of the wing truss are alined and detachably connected together to form the continuous, unbroken main wing truss extending longitudinally through the wing 10. This is accomplished by providing the opposite outer ends of the upper and lower longitudinals 40 and 41, respectively, of the wing truss beams A, B and C of the unit section of the main wing truss in the center panel 11, with the socket fittings 60, and by providing the inner ends of the upper and lower longitudinals 40 and 41, respectively, of the wing truss beams in each unit section of the main wing truss in the outer wing panels 12, respectively, with the ball fittings 61 which are adapted to fit and be detachably secured into the socket fittings 60, in the center panel section of the wing truss. Fig. 11 of the accompanying drawings illustrates the construction, mounting and relative positions of these fittings 60 and 61 for detachably mounting the outer panels 12 of the wing to the center panel. The center panel socket fitting 60 comprises a body length or sleeve 62 which extends a distance into the end of a truss beam longitudinal and is rigidly secured and fixed therein by a series of transverse rivets or bolts 63 extending through the beam longitudinal and the sleeve. The body or sleeve 62 is provided with the outer head 64 exteriorly screw threaded and formed with a socket 65 in the outer end thereof. The ball fitting 61 which is secured to the inner ends of the truss beam longitudinals of the outer panels 12, comprises the body length or sleeve 66 which is extended a distance into the end of a truss beam longitudinal and secured therein by the transverse bolts or rivets 67, in a manner similar to that of the fittings 60. The outer end of the sleeve 66 is formed with a rounded head or ball on the outer end of the beam longitudinal and a locking sleeve 69 is loosely mounted and confined on the outer end of the beam longitudinal by means of a flange 70 formed around the inner end of the rounded or ball head 68 of the fitting 61. The locking sleeve 69 is provided with an internally threaded bore which is adapted to receive the threaded head 64 of the fitting 60, and is also formed with a positioning bore through the medium of which the dihedral angle at which the outer panels are mounted on and to the center panel is determined, as clearly shown in Fig. 11.

As explained, the outer ends of the center panel truss beam longitudinals are each provided with a socket fitting 60 and the inner ends of the outer panel truss beam longitudinals are each provided with a socket fitting 60 and the inner ends of the outer panel truss beam longitudinals are provided with the ball fittings 61, respectively. The outer panels 12 are detachably mounted on and attached to the center panel 12, by alining and seating the ball fittings 61 thereof in the respective socket fittings 60 of the center panel and then screwing the sleeves 69 of the fittings 61 onto the respective threaded heads 64 to draw the outer wing panel beams into alinement with the center panel beams, with the ball heads 68 tightly seated in the sockets 65 of the center panel fittings 60, respectively. The angle of the outer panels 12 to the center panel 11 is determined by the angle of the positioning bores in the sleeves 69 to the longitudinal axis of the said sleeves, respectively. Thus the outer panels are quickly and easily attached rigidly and securely to the opposite ends of the center panel 11, respectively, with the sections or units of the wing truss alined to form the continuous rigid main longitudinal wing truss and with the outer panels 12 forming lateral alined continuations of the center panel to form the wing 10, by means of the attaching and locking sleeves 69, which connect and rigidly join the truss beams of the outer panels to the truss beams of the center panels. It will be clear from the foregoing that the outer panels can be quickly and easily detached and removed from the center panel when desired.

Although the construction and mounting of the internally trussed monoplane wing 10 formed of the center panel 11 and the outer panels 12, is of sufficient strength to withstand and care for the normal loads and stresses to which it is subjected, in order to materially increase the factor of safety of this wing construction and mounting in the illustrated design and adaptation thereof, exterior struts between the wing and the undercarriage 18 are provided. In the present example, exterior streamline struts 71 extend from the opposite ends of the trailing portion of the undercarriage lift surface 20, upwardly to the opposite outer panels 12, respectively, of the wing 10. Each of these struts 71 is extended upwardly and attached to its respective outer panel, at the lower longitudinal of the middle truss beam B thereof at about the second cell of the panel outwardly from the inner end thereof. Each strut 71 is braced by and connected with the adjacent outer end portion of the center panel 71 by a vertically disposed strut 72, see Fig. 2 of the drawings. Thus, by the provision of the struts 71 and 72 the loads and stresses on the detachable mountings for the outer panels are materially relieved, as well as considerable of the wing loads being transmitted and distributed to the undercarriage trusses, with an increase in the factor of safety of the wing through the use of a minimum extent of exposed resistance creating surfaces.

One of the fundamental and basic features of the present invention which is of particular importance and through the medium of which the practical and efficient embodiment of the various design and constructional features hereinbefore described is made possible, resides in the design, construction and mounting of the internally trussed empennage supporting outrigger girders 25. The preferred airplane design and mounting and relative arrangements of major elements thereof, includes the internally braced, semicentilever monoplane wing 10 formed in three sections or units, center panel 11 and opposite detachable outer panels 12, constructed and assembled as described in detail hereinbefore.

In the illustrated embodiment of monoplane wing 10, the center panel 11 thereof is of smaller chord than the opposite outer panels 12, as clearly shown in Figs. 1 and 4, of the drawings, and the outer panels gradually decrease in chord outwardly toward the tips, which outward decrease is formed by inclining the trailing edge of each outer panel forwardly to the wing tips. The internally trussed outrigger girders 25 are detachably secured to the center panel section of the main wing truss at the opposite outer end portions thereof, adjacent the inner ends of the opposite outer panels 12, respectively, in assembled position thereof on the center panel 11. In this manner through the construction and mounting of the girders 25, the empennage loads and stresses are distributed from the girders directly to the center section of the main longitudinal wing truss and evenly distributed therealong and absorbed thereby.

The preferred design and construction of the empennage supporting outrigger girders 25 illustrated herewith, provide built-up hollow girders of triangular cross section tapering gradually rearwardly in width and depth, and mounted in position with a flat surface thereof uppermost and in substantially the same horizontal plane as the plane of the upper surface of the center panel 11. Referring particularly to Figs. 4 and 5 of the drawings, it is seen that the girders 25 are built up of the upper spaced longitudinal angle bars 73 and the lower longitudinal angle bar 74 disposed below and centrally with respect to the upper longitudinal bars 73. The upper longitudinal bars 73 are interconnected and interbraced by a series of spaced transverse cross bars 75 extending at substantially right angles therebetween and connected and attached to the longitudinal bars 73 by means of the attaching plates 76. A series of diagonal brace bars 77 are secured across the longitudinal bars 73 and extending between the transverse brace bars 75, see particularly Fig. 4 of the drawings. The lower longitudinal bar 74 is V-shaped in cross section with the opposite flanges thereof extending upwardly and is interconnected with the upper longitudinal bars 73 by a series of vertically disposed brace bars 78 at spaced intervals along and between the spaced upper longitudinal bars 73 and the lower longitudinal bar 74, respectively. These vertically disposed opposite brace bars 78 are provided at the forward lengths of the girders 25 only, in the illustrated example. A series of diagonal brace bars 79 are disposed between each upper longitudinal bar 73 and the lower longitudinal bar 74 to form the opposite sides of the girders 25 and vertically disposed bracing therebetween throughout the length thereof.

One method of fitting for securing the ends of the opposite side diagonal brace bars 79 to the opposite flanges of the lower longitudinal bar 74, is illustrated in Figs. 18 and 19 of the drawings, and comprises the fitting 80 extending under and around the lower longitudinal. Each side of the fitting 80 terminates in the upwardly extending diverged lugs 81 to which the opposite diverged diagonal braces 79 are respectively attached by means of the rivets 82 extending through the lower longitudinal 74, fitting lugs 81 and the diagonal braces 79, thus forming a rigid connection and attachment for the braces to the opposite flanges of the lower longitudinal 74. Suitable fittings 83 are provided for connecting the upper ends of the diagonals to the respective upper longitudinals 73 thereabove. The rear end construction of the girders 25 is disclosed in Fig. 14 and conforms to and follows the foregoing type of construction. The girders so constructed provide built-up structures rigidly braced to care for and transmit loads and stresses applied thereto in both vertical and horizontal planes, and attain a maximum strength structure of minimum weight. The girder structures 25 are covered with and enclosed by a suitable skin, in the present instance corrugated metal sheet with the corrugations disposed longitudinally thereof. The complete covered girders are shown throughout the drawings, although the corrugations in the skin thereof are not indicated, it being understood that in the present all-metal construction the use of such skin is preferred.

The internally trussed outrigger girders 25 are detachably connected to and mounted on the opposite outer end portions of the section of the main longitudinal wing truss in the center panel 11, and this is accomplished by a construction in the center panel truss which provides, in effect, continuations of the outrigger girders extending transversely through, and built into the center panel truss to form a portion of the construction thereof. This construction of built-in continuations of the outrigger girders is particularly illustrated in Figs. 4 and 5 of the drawings. The extreme outer ends of the center panel truss are provided with the upper and lower contour formers 84 and 85, respectively, which terminate at the rear ends thereof at the upper and lower longitudinals 40 and 41, respectively, of the rear wing truss beam C. A distance inwardly from the outer end contour formers 84 and 85, equal to the distance between the inner ends of the outrigger girder upper longitudinals 73, upper and lower contour formers 86 are provided extending transversely across the wing truss and terminating at the upper and lower longitudinals 40 and 41, respectively, at the rear wing truss beam C, in a manner similar to the upper and lower contour formers 84 and 85. Thus, at each end of the section of the wing truss extending longitudinally of the center panel 11, are the transversely extending upper contour formers 84 and 86 spaced a distance apart equal to the distance between the inner ends of the upper longitudinal bars 73 of the outrigger girders 25.

Any suitable or desired arrangement of interbracing such as the diagonal braces 88 is provided between the upper contour formers 84 and 86, and any suitable vertically disposed braces (not shown) are provided between the pairs of upper and lower contour formers 84 and 85, and 86, to rigidly interbrace the same in and with the truss of the center panel 11. A pair of braces 87 extend downwardly from the rear ends of each pair of spaced upper contour formers 84 and 86 on the upper longitudinal 40 of the rear beam C, and converge at a point below the lower longitudinal 41 of the beam C, a distance from the upper longitudinal 40 equal to the depth of the inner end of an outrigger girder 25. (See Fig. 5.) A brace 89 extends upwardly and forwardly from the lower converged ends of each pair of depending braces 87, to the lower longitudinal 41 of the front truss beam A, of the center panel, and is attached to a point thereon midway between the spaced lower contour formers 85 and 86 adjacent thereto, respectively. By the foregoing construction the wing truss of the center panel 11 is provided in effect with built-in girders extending transversely therethrough and forming a part thereof at the opposite outer ends of the center panel 11, respectively. The outrigger girders 25 are mounted on and extend rearwardly from the rear, or trailing portion of the center panel by attaching the inner ends thereof to the rear ends of the built-in transverse girders, respectively, described above, with the upper girder longitudinals 73 alined with the spaced upper contour formers 84 and 86, and with the lower girder longitudinals attached at the lower converged ends of the braces 87, respectively. In this manner the built-in girders of the center panel form continuations of the outrigger girders extending transversely through the opposite end portions of the center panel.

Preferably, the girders 25 are detachably mounted on and secured to the center panel, and one manner of so mounting the girders is illustrated in Fig. 10 of the drawings. The inner ends of the girder longitudinals are provided with the outwardly extending eyes or sleeves 90 rigidly attached thereto, and the alined points on the rear of the built in transverse girders in the center panel are each provided with the spaced ears 91 provided with alined bores therethrough. In order to attach the girders to the center panel, the inner ends thereof are alined with the upper contour formers 84 and 86, and the lower brace 89, respectively, and the eyes 90 are inserted between the pairs of ears 91 respectively, alined therewith on the center panel truss, then by inserting suitable attaching pins or bolts 92 through the pairs of ears 91 and the eyes 90 positioned therebetween, respectively, the girders 25 are rigidly and detachably mounted in position on and secured to the transversely extending built-in girder units, respectively, forming a part of the center panel truss construction, as will be readily understood by reference to Figs. 4, 5 and 10, of the drawings.

In mounted assembled position on the center panel 11, the inner forward ends of the outrigger girders 25 are attached to the rear truss beam C, adjacent the opposite outer ends thereof and are respectively alined with and form a rearward extension and continuation of the transverse built in girders defined by the spaced pairs of upper and lower outer contour formers 84 and 85; and 86, respectively. The forward ends of the girders 25 extend and pass between the outer ends of the trailing edge portion of the center panel which extends rearwardly from the main truss thereof, and the trailing edge portion of the adjacent outer panels 12, respectively which extends rearwardly from the main longitudinal wing truss therein. Preferably, the depth of the girders at the forward ends thereof is greater than the depth of the center panel to which they are attached, so that the rear end of the built-in continuations or extensions of the girders formed in the panel truss are provided with the depending braces 87 converged below the center panel 11 and provided with the forwardly and upwardly extending braces 89 to the lower longitudinal 41 of the front wing truss beam A of the panel truss. A covering or skin forming continuations of the skin on and covering the sides of the outrigger girders 25 is provided and extends along the braces 89, and inclined upwardly and outwardly therefrom to the underside of the center panel thereabove, to form upwardly inclined surfaces in continuation of the forward lower ends of the outrigger girders, respectively, to the forward under side of the center panel 11. The center panel 11 and the built in continuations of the outrigger girders extending transversely of and through the panel truss at the outer end portions thereof, are further braced and strengthened by struts 93 extending upwardly from opposite outer ends of the trailing portion of the under-carriage lift surface 20 to the lower longitudinal 41 of the rear panel truss beam C at the points of connection thereon of the lower, inner contour formers 86, respectively, of the built in girder extensions of the center panel 11.

Several modified designs and mountings of empennage supporting outrigger girders of the built up internally trussed type of the invention are purely diagrammatically shown in outline, in Figs. 20 and 22 of the drawings. In Fig. 20, the forward length of an outrigger girder 94 of substantially diamond shape in cross section, Fig. 21, is illustrated as mounted on and to an internally trussed wing of the general type of the wing 10 illustrated in connection with the preferred triangular design of outrigger girder 25. In the diamond design of outrigger girder 94 a built-in extension thereof 95, is constructed in the wing and extends above and below the trailing portion of the wing, to which built in extension the girder 94 is attached in rearward continuation thereof and alinement therewith. The construction and arrangement of this form and design of outrigger girder follows that of the preferred design of girder 25, described in detail hereinbefore.

Fig. 22 illustrates diagrammatically an outrigger girder 25 attached to and extending rearwardly from the wing 10, above the upper surface thereof and in reversed position with respect to that of the preferred mounting. In this modified mounting of a triangular design of outrigger girder the longitudinal edge of the girder is uppermost instead of being on and forming the lower edge, as in the preferred mounting. The construction in this modified form follows the principles of the preferred construction and mounting.

One manner of mounting and attaching the tail unit or empennage 26 in position on and across the rear ends of the outrigger girders 25, is more or less diagrammatically illustrated in Figs. 16 and 17 of the accompanying drawings, taken in connection with the disclosures of Fig. 13. The fixed horizontal stabilizer 27 which extends across the rear ends of the girders 25 is constructed of a frame which includes the front and rear longitudinal beams 95 and 96, respectively, spaced apart and interconnected by suitable trussing and bracing 97. Preferably, the stabilizer 27 is formed integral with the twin vertical stabilizers 29 on the opposite ends thereof above the girders 25 and along the longitudinal centers thereof, respectively. The rear stabilizer beam 96 extends across the girders 25 adjacent the rear ends thereof and suitable fittings 98, adjustable vertically and horizontally, are secured at the outer ends of the girders along the longitudinal centers thereof, respectively, and these fittings are attached to the rear beam 96 which extends thereacross and thereabove. Fittings 99 are attached to girder cross braces 75 adjacent the front stabilizer beam at the ends thereof which extend across the girders. These fittings 99 are attached to the cross braces 75 along the longitudinal centers of the girders, respectively, and are adjustably secured to the rear beam 95 which extends thereabove. Thus, the horizontal stabilizer 27 is adjustably mounted on and attached to the girders 25 at its opposite outer ends by the pairs of fittings 98 and 99, respectively, which are secured along the longitudinal center of each girder. Each vertical stabilizer 29 is adjustably secured and attached at its forward lower end to its respective supporting girder 25 by means of a fitting 100 mounted therebelow to an adjacent girder or cross brace 75 along the longitudinal center of the girder, respectively. By the foregoing manner of mounting the integral or built up horizontal stabilizer 27 and vertical stabilizers 29 to the girders 25, it is possible to properly adjust and line up these empennage surfaces, as well as to readily detach and remove the same as a unit, from the outrigger girders 25.

The preferred form and construction of the body or nacelle for the monoplane design of the pusher type disclosed herein as embodying the invention, is illustrated in detail in Fig. 12, of the drawings. This nacelle 15 is mounted on the center panel 11 along the longitudinal center of the airplane, and extends a distance forwardly from the center panel. The main frame of the nacelle 15 comprises the opposite side cantilever trusses 101 attached at the rear ends thereof to the front middle and rear center panel truss beams A, B and C by the braces 102, 103, and 104, respectively, forming a part of the trusses 101. The main cantilever trusses 101 extend forwardly from the center panel 11 to which they are tied and attached at their rear ends, and are provided at their forward ends with a frame 105 extending therebetween and forwardly therefrom to form and define the nose of the nacelle. The nacelle frame, so formed and attached, is provided with any suitable or desired arrangement of members (not shown) extending therebetween and thereacross to which the skin 106 is attached to cover the frame and form the desired exterior shape and contour to the nacelle. This skin 106 is preferably corrugated metal sheet which may be attached by means of rivets, welding or in any other desired manner. Preferably the nose of the nacelle 15 is detachable so that ready access may be had to the interior of the nacelle. The interior arrangement of the nacelle 15 provides a pilot's cockpit 107 in the forward length of the nacelle to the rear of the nose thereof, which latter forms a protection to the pilot in the event of the airplane nosing over on the ground; and an observer's cockpit 108 to the rear of the pilot's cockpit. The motor M is mounted and installed in the rear end of the nacelle above and supported directly from the main truss of the center panel through the engine bearers 109. The crank shaft 24 of the motor M extends rearwardly through the end of the nacelle, which latter terminates approximately at and above the trailing edge of the center panel 11, along the longitudinal axis of the nacelle, and receives the pusher propeller P on the outer end thereof. By the foregoing construction and mounting of the fuselage 15 the proper and required balance is obtained in the airplane through the forward extension thereof beyond the wing 10, to offset the rearwardly extending outrigger girders 25 supporting the empennage 26, while through the medium of the cantilever trusses 101 tied and secured at their read ends to the center panel truss, all exterior exposed bracing between the forward end of the nacelle 15 and the wing 10 and undercarriage 18 is eliminated with the resulting advantages in low parasite resistance. Preferably, the nacelle 15 is detachably tied and secured to the center panel truss, so that the nacelle can be readily removed as a unit without disturbing the mounting of the remaining major elements of the airplane. The main fuel supply tanks 110 for the motor M are preferably mounted on the center panel 11 at opposite sides of and adjacent the nacelle 15, the tanks being formed of such a shape and curvature as to substantially conform to the wing section, and to the extent possible provide, if not an actual lift surface, at least a structure of low head resistance (see Figs. 1 and 2).

A modified form, construction and mounting of nacelle is disclosed in Fig. 23, of the accompanying drawings, and provides for a different interior arrangement and motor mounting in the nacelle. In this form the nacelle 111 is constructed of a frame formed of the main trusses 112 which extend across and a distance forwardly and rearwardly from the center panel 11. The trusses 112 extend a distance rearwardly beyond the trailing edge of the center panel 11 and are attached and secured to the center panel truss beams A, B, and C, in such a manner that these truss beams, in effect, form a part of the nacelle trusses, as will be seen by reference to Fig. 23. A suitable frame work 114 extends upwardly above the main nacelle trusses 112 and a skin or covering 115, preferably corrugated metal sheet, is secured over the trusses 112 and the framework 114 to provide the desired shape and contour to the nacelle 111. The motor M is mounted above and extends partially forward of the leading portion of the center panel 11, by means of engine bearers 116, supported from the center panel truss. An observer's cockpit 117 is provided in the nose of the nacelle 111, forwardly of the motor M, and a pilot's cockpit 118 is provided to the rear of the motor M. With the motor mounted forwardly of the center panel it is necessary to provide a propeller drive mechanism therefrom which permits of the proper position of the axis of thrust with respect to the airplane. In the present instance, the motor crank shaft 119 is extended rearwardly to the rear end of the nacelle and a propeller shaft 120 is mounted thereabove along the required axis. The shaft 120 extends rearwardly through the nacelle 111 and a pusher propeller P is mounted on the outer end thereof. A suitable gear arrangement (not shown) operatively connects the shaft 119 with the propeller shaft 120, and is housed within the gear casing 121.

A further modification in the preferred form of the invention described hereinbefore, is illustrated in Figs. 24 and 25 of the drawings, in which the land undercarriage 18 is replaced by twin pontoons 122 to form a seaplane embodying the various features of the invention. The pontoons 122 are connected with and braced from the center section 11 by an arrangement of trusses and braces 123, and a lift surface 124 is provided between the pontoons 122 and braced from the center panel by the braces 125. The forward ends of the pontoons are braced from the nacelle 15 by struts 126, and from the center panel 11 by the struts 127. With the exception of the pontoons 122 and the trussing therefor, the design, construction and mounting of wing 10, nacelle 15, and outrigger girder 25, follows that of the preferred design of pusher type,—monoplane described hereinbefore as embodying the various features of the invention.

The design of pusher type monoplane described hereinbefore as embodying the preferred expression of the various features of the invention, provides a monoplane having an outrigged tail unit or empennage in which the objectionable exposed, exterior bracing between the outrigger girders and the main airplane structure (wings, body and undercarriage) is eliminated. This is made possible by the construction of internally trussed outrigger girders 25 which are mounted at their forward ends to the main truss of an internally trussed wing, the construction and mounting of the girders being such that they, in effect, extend transversely through and form a part of the main wing truss, with the result that the outrigger and empennage loads, both vertical and horizontal, are transmitted by the girders directly to and distributed evenly along the main wing truss without the provision of exterior bracing for the outrigger girders. Through this construction and mounting the exposed surfaces within the pusher propeller slipstream are materially reduced and one of the serious disadvantages, slipstream interference, encountered in prevailing pusher and other types of airplanes having an outrigged tail unit, is practically overcome.

Attention is directed to the design and construction of the internally trussed girders which provides depth or thickness therein to care for vertically acting loads imposed thereon, and width to care for horizontally acting loads imposed thereon. Preferably, although not essentially, the girders are formed at their forward ends of a greater depth than the thickness of the wing to which they are mounted and attached and are braced from the lower ends to a wing by upwardly and forwardly inclined continuations of the girders merging into the under surface of the wing. By such construction and arrangement great strength is obtained against vertically acting loads imposed on the outer ends of the girders, without the use of the usual exterior outrigger bracing. The internally trussed outrigger girders are covered and enclosed by a skin, to present exteriorly smooth, unbroken surfaces forming, in effect, rearward continuations of the wing to which they are attached, thus providing structures of low parasite resistance and skin friction.

It will be clear, and is understood, that the outrigger construction and mounting of the invention is not limited to use on and in connection with airplanes of the monoplane type as it is equally applicable to mounting on and use in connection with multiplane types. The outrigger girders of the invention can be readily mounted and attached to the desired supporting surface of a multiplane, with equal results and advantages in reduced parasite resistance and slipstream interference, as in the monoplane types.

The various features of the invention relating to the design mounting and relative arrangement of the major elements forming an airplane embodying the same, are not limited to presentation in all metal construction illustrated and described herewith by way of a preferred example of an airplane in which the features of the invention are incorporated. It will be clear to those skilled in this art that the features of the invention can be readily worked out and presented in any desired materials or combinations, of materials, without stepping beyond the limits of the invention.

By the design, construction and mounting of the internally trussed, covered outrigger girders detachably mounted and secured at their forward ends to the center panel of an internally braced wing of the monoplane type provided with detachable outer panels, and a detachable nacelle consisting essentially of a cantilever frame detachably tied to the center panel and extending forwardly therefrom, a monoplane of the pusher type requiring an outrigged tail unit or empennage is made possible, in which an extremely "clean", well balanced design of low parasite resistance due to the practical elimination of exterior bracing, and a high factor of safety, as well as a design capable of a relatively high performance for such types, results. The detachable connecting and assembling of the major elements embodying the invention is applicable generally to all types, and permits of an airplane formed thereof being readily knocked down for storage and for shipment, while the construction of these detachable major elements is such that they can be easily and quickly assembled in proper alinement.

It is evident that various changes, modifications and variations in constructions, details and arrangements might be resorted to without departing from the spirit and scope of the invention, and hence I do not desire to limit myself to the exact disclosures hereof.

Desiring to protect my invention in the broadest manner legally possible, what I claim is:

1. In an airplane, an internally braced wing including a main longitudinal wing truss, and an empennage supporting outrigger detachably mounted on, secured to, and supported from said wing truss, the wing end of said outrigger forming a composite part of said wing truss in mounted position.

2. In an airplane, an internally braced wing, and an empennage supporting outrigger, comprising spaced rearwardly extending internally trussed outrigger girders detachably mounted at the forward ends thereof to the internal bracing of said wing, the said outrigger girders supported from the inner detachably mounted ends thereof without exterior bracing therefor.

3. In an airplane, an internally braced wing including a main longitudinal wing truss, a transversely disposed girder built in said wing and attached to said truss, and a built up internally trussed outrigger girder detachably mounted on and connected to said built-in wing girder, the said outrigger girder extending outwardly from said wing in alinement with said built-in wing girder and supported in extended position therefrom.

4. In an airplane, an internally braced wing including a main longitudinal wing truss and a transverse girder built into said wing and forming a part thereof, the said built-in girder of greater depth than the thickness of said wing and extending a distance beyond the surface thereof, and a built-up internally trussed outrigger girder attached to one end of said built-in wing girder and extending outwardly therefrom in continuation thereof, the said outrigger girder supported in extended position from and by said built-in wing girder.

5. In an airplane, an internally braced monoplane wing consisting of a center panel and detachable outer panels in lateral continuation thereof, and an outrigger structure detachably mounted on said center panel and attached to the internal bracing therefor, the said outrigger structure supported from and in extended position by said center panel and the interior bracing thereof.

6. In an airplane, an internally braced monoplane wing consisting of a center panel and detachable outer panels in lateral continuation thereof, and an empennage supporting outrigger comprising spaced internally trussed girders attached at the forward ends thereof to the internal bracing of said center panel and extending rearwardly therefrom and supported in extended position thereby without exterior bracing for the said girders, the internal girder trussing transmitting the girder loads to the center panel internal bracing.

7. In a monoplane of the pusher type, a wing consisting of center panel and outer panels in lateral continuation thereof, an undercarriage depending from said center panel, a nacelle mounted on said center panel, a pusher propeller mounted at the rear of said nacelle on the exterior thereof and rearwardly of the center panel, and an empennage supporting outrigger structure comprising spaced internally trussed outrigger girders extending rearwardly from said center panel at opposite ends thereof, said outrigger girders attached to and supported from the center panel without exterior bracing from the extended ends thereof.

8. In an airplane, an internally braced wing consisting of a center panel and outer detachable panels in continuation thereof, said wing including a main longitudinal wing truss extending therethrough, said center panel provided with built in girders extending transversely therethrough, attached to said wing truss and confined within to form a part of the center panel adjacent the outer ends thereof, respectively, and built-up internally trussed outrigger girders detachably mounted and secured to said built-in wing girders, respectively, and extending outwardly therefrom in alined continuation thereof and supported in extended position thereby, the said girders enclosed in a skin forming a substantial unbroken continuation of said center panel.

9. In an airplane, an internally braced wing, and a nacelle mounted thereon, and extending forwardly therebeyond, said nacelle detachably mounted at the rear end thereof to and supported by the internal wing bracing.

10. In an airplane of the pusher type, an internally braced wing, a nacelle mounted thereon and extending forwardly thereacross from the trailing portion of said wing a distance therebeyond, the said nacelle attached at the portion extending across said wing to the internal bracing thereof, and a motor mounted in said nacelle and supported from the internal wing bracing, said motor provided with a pusher propeller at the rear and on the exterior thereof, back of the trailing edge of said wing.

11. In an airplane, an internally braced wing, a nacelle mounted thereon and extending forwardly therefrom, the said nacelle consisting of a frame formed of cantilever trusses attached at the rear ends thereof to the internal wing bracing and extending forwardly beyond said wing, and a motor mounted in said nacelle and supported therein from the internal bracing of said wing.

12. An all metal airplane wing comprising a main longitudinal truss consisting of interconnected and interbraced longitudinal wing truss beams, a series of upper and lower contour formers attached transversely thereacross and converged forwardly and rearwardly of said wing truss to define the leading and trailing edges, respectively, of said wing, a series of spaced longitudinal stringers attached across said upper and lower contour formers, and strips of metal sheet disposed transversely across and attached to the upper and lower longitudinal stringers to form a skin for said wing.

13. An all-metal airplane wing comprising, a frame consisting essentially of front, middle and rear built-up metal truss beams spaced apart and extending longitudinally of the wing, the said front, middle and rear longitudinal truss beams interconnected and interbraced to form the main longitudinal wing truss, a series of spaced upper and lower contour formers attached transversely across said wing truss beams, extending forwardly and rearwardly therefrom and converged to define the leading and trailing edges, respectively, of said wing, bracing interconnecting said upper and lower contour formers and said truss beams, a series of stringers attached to and across said upper and lower contour formers and extending longitudinally of the wing, and strips of metal sheet extended transversely across the top and bottom of the wing frame so formed, the said metal sheet attached to said stringers and the upper and lower sheets converged along the forward and rear ends of said converged contour formers, respectively, to form a skin enclosing the wing frame.

14. In an airplane, an internally braced wing, an empennage supporting outrigger comprising internally trussed girders attached at the forward ends thereof to and supported from the internal bracing of said wing and extending rearwardly from and in continuation of said wing, and an empennage mounted on and across the outer ends of said girders, the said empannage detachably secured on and attached to the internal trussing of said girders and removable as a unit therefrom.

15. In an airplane, an internally braced wing, an empennage supporting outrigger comprising spaced internally trussed outrigger girders extending rearwardly from said wing in substantial continuation thereof and attached at their forward ends to and supported from the internal wing bracing, and an empennage mounted across the rear outer ends of said girders and detachably supported thereon from and secured to the internal girder trussing, the said empennage removable as a unit from said girders.

16. In an airplane, an internally braced wing, an empennage supporting outrigger comprising built-up hollow, internally trussed girders attached at their forward ends to and supported from the internal wing bracing, the said girders extending rearwardly from said wing in horizontal continuation thereof, an empennage mounted on and secured across the outer, rear ends of said girders, and empennage controls extending from the empennage surfaces forwardly through and confined within said hollow outrigger girders.

17. In an airplane, an internally braced wing, and a built-up internally trussed outrigger girder extending rearwardly from and attached and supported at the forward end thereof from said wing, the said girder of greater depth at the forward end thereof than the thickness of said wing, and a truss extending between the internal bracing of said wing and the forward end of said girder.

18. In an airplane, an internally braced wing, and a built-up internally trussed outrigger girder extending rearwardly from and attached and supported at the forward end thereof from said wing, the said girder of a greater depth at the forward end thereof than the thickness of said wing and mounted with its upper surface in substantially the same plane as and in rearward continuation of the upper surface of said wing, the forward end of said girder depending below the said wing, and a truss extending between the forward portion of the internal bracing of said wing and the lower forward end of said girder, a skin covering said truss and extending upwardly and forwardly from the forward end of said girder in continuation thereof and merging into the under side of said wing in the forward portion thereof.

19. An all-metal airplane wing comprising, a main longitudinal truss, a series of spaced upper and lower contour formers attached transversely thereacross, a series of upper and lower longitudinal stringers attached to and extending across said contour formers, and metal sheet attached to said contour formers at intervals therealong, the said metal sheet attached at intervals along said longitudinal stringers between the said contour formers.

20. In an all-metal airplane wing, a series of transverse upper and lower contour formers, a series of upper and lower longitudinal stringers attached to and extending transversely across said contour formers, and metal sheet attached over and across said upper and lower contour formers and stringers, respectively, by a series of binding strips placed over said metal sheet along the line of said contour formers and attached thereto, the said metal sheet attached to said longitudinal stringers at intervals therealong between said contour formers.

21. In an airplane, an internally braced wing of the thick section type, and an empennage supporting outrigger comprising, spaced internally trussed outrigger girders having substantial depth and width, said internally trussed girders extending into and forming composite parts of the wing with the internal trussing thereof forming a component part of the internal wing bracing, the said girders extending outwardly from the wing in substantial continuation thereof with the internal trussing transmitting the vertical and horizontal loads imposed on the girders by an empennage mounted thereon to the internal bracing of the wing 22. In an airplane, an internally braced wing, and an empennage supporting outrigger embodying spaced outwardly extending internally trussed outrigger girders detachably mounted at the inner ends thereof to the internal bracing of said wing.

RANDOLPH F. HALL.